(12) United States Patent
Okuhata

(10) Patent No.: US 11,294,334 B2
(45) Date of Patent: Apr. 5, 2022

(54) ELECTRONIC TIMEPIECE, MOVEMENT, AND MOTOR CONTROL CIRCUIT FOR A TIMEPIECE

(71) Applicant: Seiko Epson Corporation, Tokyo (JP)

(72) Inventor: Tomoki Okuhata, Shiojiri (JP)

(73) Assignee: Seiko Epson Corporation

( * ) Notice: Subject to any disclaimer, the term of this patent is extended or adjusted under 35 U.S.C. 154(b) by 47 days.

(21) Appl. No.: 16/780,985

(22) Filed: Feb. 4, 2020

(65) Prior Publication Data
US 2020/0249631 A1 Aug. 6, 2020

(30) Foreign Application Priority Data
Feb. 5, 2019 (JP) .............................. JP2019-018635

(51) Int. Cl.
| | |
|---|---|
| *G04C 3/14* | (2006.01) |
| *H02P 8/02* | (2006.01) |
| *H02P 8/40* | (2006.01) |
| *H02P 8/12* | (2006.01) |
| *H02P 8/34* | (2006.01) |

(52) U.S. Cl.
CPC ............... *G04C 3/143* (2013.01); *H02P 8/02* (2013.01); *H02P 8/12* (2013.01); *H02P 8/34* (2013.01); *H02P 8/40* (2013.01)

(58) Field of Classification Search
CPC ...... H02P 6/18; H02P 8/12; H02P 6/06; H02P 6/14; G04C 3/143; G04C 3/16; H02K 29/12; H02K 21/24; H01R 39/46
See application file for complete search history.

(56) References Cited

U.S. PATENT DOCUMENTS

| | | | | |
|---|---|---|---|---|
| 5,581,519 A | * | 12/1996 | Hara ...................... | G04C 10/00 368/204 |
| 9,577,551 B2 | * | 2/2017 | Aiura ........................ | H02P 3/14 |
| 2008/0246437 A1 | * | 10/2008 | Kitahara ................ | G04C 10/04 320/134 |
| 2010/0001673 A1 | | 1/2010 | Cardoletti et al. | |
| 2014/0071795 A1 | * | 3/2014 | Manaka ................... | H02P 8/38 368/80 |
| 2017/0038736 A1 | * | 2/2017 | Kawaguchi ............ | G04C 3/143 |

FOREIGN PATENT DOCUMENTS

| | | |
|---|---|---|
| JP | H10-098897 A | 4/1998 |
| JP | 2009-542186 A | 11/2009 |

* cited by examiner

*Primary Examiner* — Said Bouziane
(74) *Attorney, Agent, or Firm* — Harness, Dickey & Pierce, P.L.C.

(57) ABSTRACT

An electronic timepiece enables driving a motor in a reverse direction. The timepiece has a current detector detecting a current value flowing through a coil; a driver controller that outputs, according to the detected current value, a first drive signal turning the rotor in a forward direction to a position not pulled to a second statically stable position from a position where the rotor is pulled to a first statically stable position, outputs a second drive signal turning the rotor in a reverse direction past the dynamically stable position after outputting the first drive signal, and outputs a third drive signal turning the rotor in the reverse direction after outputting the second drive signal; and a driver that is controlled according to the first, second and third drive signals to an on state supplying drive current to the coil and an off state not supplying drive current to the coil.

10 Claims, 18 Drawing Sheets

ELECTRONIC TIMEPIECE, MOVEMENT, AND MOTOR CONTROL CIRCUIT FOR A TIMEPIECE

BACKGROUND

1. Technical Field

The present disclosure relates to an electronic timepiece, a movement, and a motor control circuit for a timepiece.

The present application claims priority based on and incorporates by reference the entire contents of Japanese Patent Application No. 2019-018635 filed in Japan on Feb. 5, 2019.

2. Related Art

JP-T-2009-542186 describes a technique for controlling rotation of a motor by turning the supply of current to the coil of the motor off when the current flow through the coil exceeds an upper threshold, and on when the current flow goes below a lower limit, and estimating the position of the rotor of the motor from the on time that power supply continues and the off time during which the power supply is continuously off. In other words, the control technique in JP-T-2009-542186 describes a method of controlling a motor based on the current supply.

However, a control technique for reversing the direction in which the motor is driven is not described in JP-T-2009-542186. Reversing the direction the motor is driven in order to move a hand to a specific position may be desirable in an electronic timepiece. A control technique enabling reversing the direction a motor is driven when the motor is driven based on the current supply is therefore desirable.

SUMMARY

An electronic timepiece according to an aspect of the disclosure has: a stepper motor including a coil, and a rotor that is pulled to a first statically stable position or a second statically stable position when a magnetic field that drives the rotor is not produced in the coil, and is pulled to a dynamically stable position when the magnetic field is produced in the coil; a current detector configured to detect a current value flowing through the coil; a driver controller configured to output, according to the current value the current detector detected, a first drive signal causing the rotor to turn in a forward direction to a position not pulled to the second statically stable position from a position where the rotor is pulled to the first statically stable position, output, according to the current value the current detector detected, a second drive signal causing the rotor to turn in a reverse direction, which is opposite the forward direction, past the dynamically stable position after outputting the first drive signal, and output, according to the current value the current detector detected, a third drive signal causing the rotor to turn in the reverse direction after outputting the second drive signal; and a driver that is controlled, according to the first drive signal, the second drive signal, and the third drive signal, to an on state supplying drive current to the coil and an off state not supplying drive current to the coil.

In an electronic timepiece according to another aspect of the disclosure, the driver controller outputs the first drive signal controlling the driver to the on state and the off state, and when a first on time, which is a continuous time of the on state corresponding to the first drive signal, or a first off time, which is a continuous time of the off state corresponding to the first drive signal, meets a specific condition, changes the drive signal output to the driver from the first drive signal to the second drive signal.

In an electronic timepiece according to another aspect of the disclosure, the driver controller changes the drive signal output to the driver from the first drive signal to the second drive signal when a previously set time has past after starting output of the first drive signal.

In an electronic timepiece according to another aspect of the disclosure, the driver controller outputs the second drive signal controlling the driver to the on state and the off state, and when a second on time, which is a continuous time of the on state corresponding to the second drive signal, or a second off time, which is a continuous time of the off state corresponding to the second drive signal, meets a specific condition, changes the drive signal output to the driver from the second drive signal to the third drive signal.

In an electronic timepiece according to another aspect of the disclosure, the driver controller changes the drive signal output to the driver from the second drive signal to the third drive signal when a previously set time has past after starting output of the second drive signal.

In an electronic timepiece according to another aspect of the disclosure, the driver controller outputs the third drive signal controlling the driver to the on state and the off state, and when a third on time, which is a continuous time of the on state corresponding to the third drive signal, or a third off time, which is a continuous time of the off state corresponding to the third drive signal, meets a specific condition, stops outputting the third drive signal.

In an electronic timepiece according to another aspect of the disclosure, the driver controller outputs the third drive signal a specific number of steps corresponding to a target rotation of the rotor.

In an electronic timepiece according to another aspect of the disclosure, the driver controller outputs, after the last third drive signal, a correction drive signal that produces a magnetic field in the same direction as the direction of the magnetic field produced by the last third drive signal of the specific number of steps.

In an electronic timepiece according to another aspect of the disclosure, the driver controller outputs the first drive signal, then outputs the second drive signal, and then outputs one step of the third drive signal when a specific time has past after outputting the third drive signal one step less than the specific number of steps.

Another aspect of the disclosure is a movement including a stepper motor having a coil, and a rotor that is pulled to a first statically stable position or a second statically stable position when a magnetic field that drives the rotor is not produced in the coil, and is pulled to a dynamically stable position when the magnetic field is produced in the coil; a current detector configured to detect a current value flowing through the coil; a driver controller configured to output, according to the current value the current detector detected, a first drive signal causing the rotor to turn in a forward direction to a position not pulled to the second statically stable position from a position where the rotor is pulled to the first statically stable position, output, according to the current value the current detector detected, a second drive signal causing the rotor to turn in a reverse direction, which is opposite the forward direction, past the dynamically stable position after outputting the first drive signal, and output, according to the current value the current detector detected, a third drive signal causing the rotor to turn in the reverse direction after outputting the second drive signal; and a driver that is controlled, according to the first drive signal, the second drive signal, and the third drive signal, to an on state supplying drive current to the coil and an off state not supplying drive current to the coil.

Another aspect of the disclosure is a motor control circuit including: a current detector configured to detect a current value flowing through the coil of a stepper motor including a coil, and a rotor that is pulled to a first statically stable position or a second statically stable position when a magnetic field that drives the rotor is not produced in the coil, and is pulled to a dynamically stable position when the magnetic field is produced in the coil; a driver controller configured to output, according to the current value the current detector detected, a first drive signal causing the rotor to turn in a forward direction to a position not pulled to the second statically stable position from a position where the rotor is pulled to the first statically stable position, output, according to the current value the current detector detected, a second drive signal causing the rotor to turn in a reverse direction, which is opposite the forward direction, past the dynamically stable position after outputting the first drive signal, and output, according to the current value the current detector detected, a third drive signal causing the rotor to turn in the reverse direction after outputting the second drive signal; and a driver that is controlled, according to the first drive signal, the second drive signal, and the third drive signal, to an on state supplying drive current to the coil and an off state not supplying drive current to the coil.

Other objects and attainments together with a fuller understanding of the disclosure will become apparent and appreciated by referring to the following description and claims taken in conjunction with the accompanying drawings.

DESCRIPTION OF EMBODIMENTS

Embodiment 1

An electronic timepiece 1 according a first embodiment of the disclosure is described below with reference to the accompanying figures.

Figure 1:
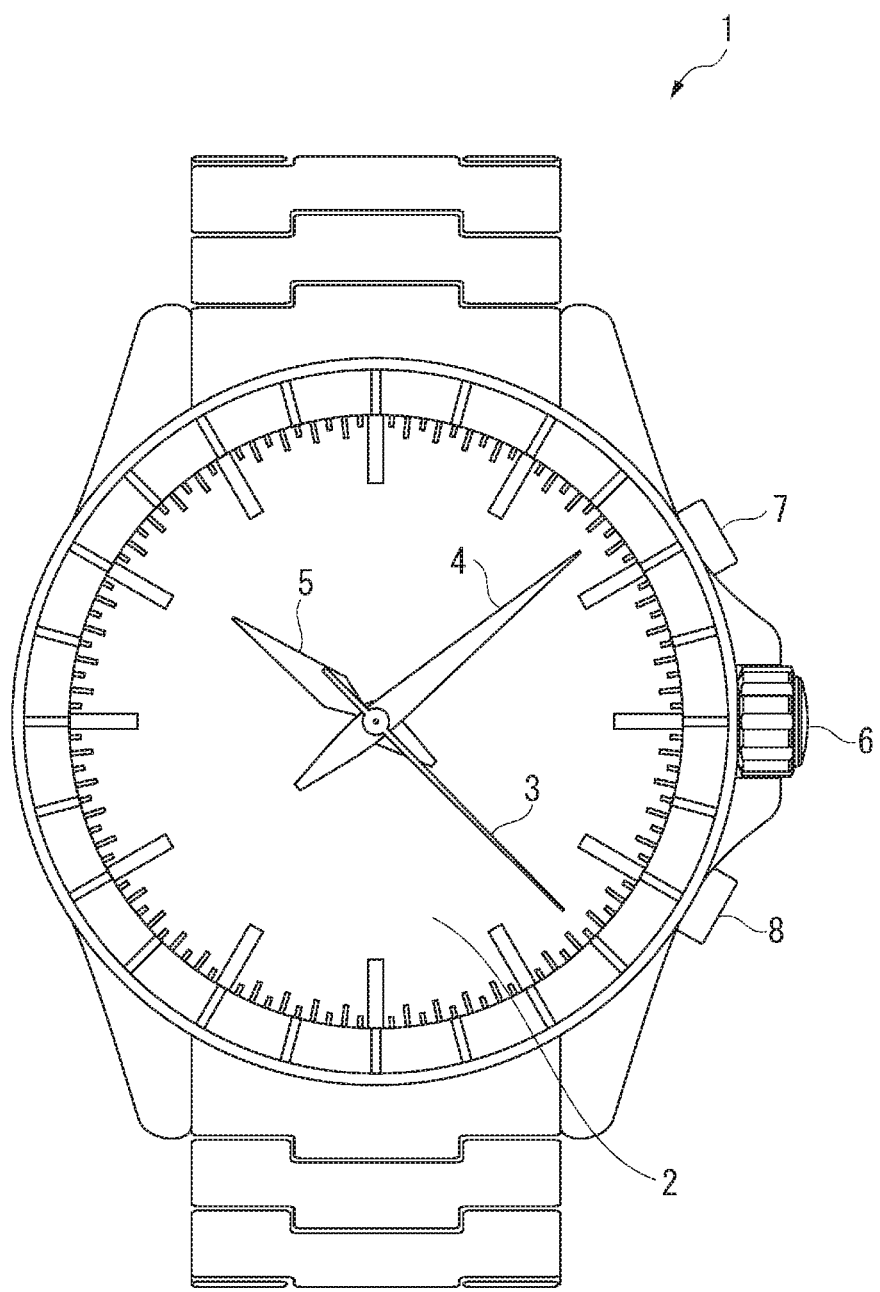
FIG. 1 is a front view of an electronic timepiece according to the first embodiment.

FIG. 1 is a front view of the electronic timepiece 1.

This electronic timepiece 1 is a chronograph watch with a stopwatch function.

As shown in FIG. 1, the electronic timepiece 1 has a round dial 2, a second hand 3, a minute hand 4, an hour hand 5, a crown 6, and an A button 7 and a B button 8.

In this example the hands 3 to 5 normally display the time, but when the stopwatch mode is selected by pressing the A button 7 for three seconds or longer, for example, the hands 3 to 5 move to the 0 position. Note that the 0 position in this example is where the hands 3 to 5 indicate 00:00:00.

When the hands 3 to 5 are at the 0 position and the A button 7 is pressed for less than three seconds, for example, to start measuring time, the hands 3 to 5 indicate the time elapsed since the A button 7 was pressed.

Circuit Configuration of the Electronic Timepiece

Figure 2:
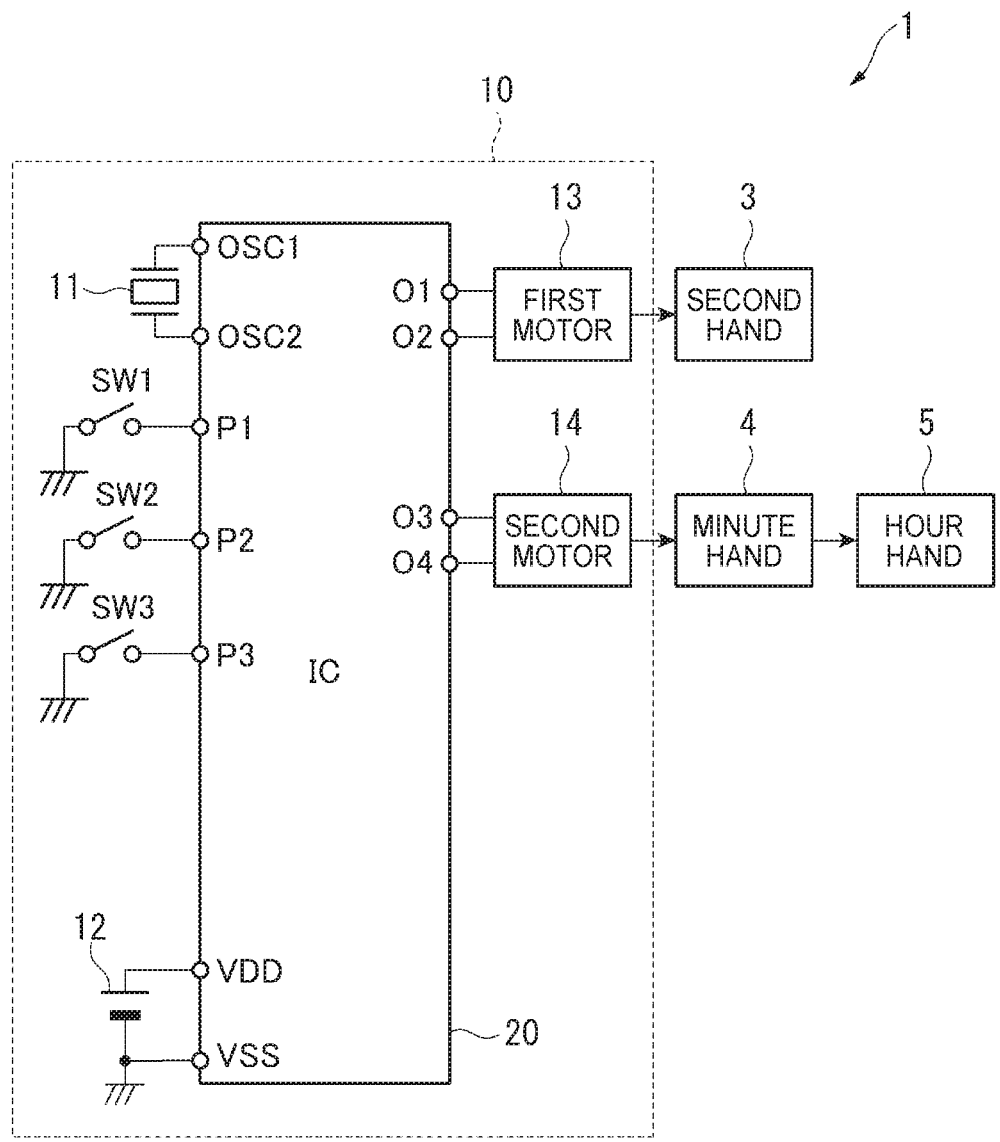
FIG. 2 is a circuit diagram showing the circuit configuration of the electronic timepiece according to the first embodiment.

FIG. 2 shows the circuit configuration of the electronic timepiece 1.

As shown in FIG. 2, the electronic timepiece 1 has a movement 10 that drives the hands 3 to 5.

The movement 10 includes a crystal oscillator 11 as a signal source, switches SW1 to SW3, a first motor 13, a second motor 14, a timekeeping chip 20, and a wheel train not shown.

Switch SW1 turns on and off in conjunction with pulling out and pushing in the crown 6 shown in FIG. 1. Switch SW2 turns on and off in conjunction with operation of the A button 7. Switch SW3 turns on and off in conjunction with operation of the B button 8.

The first motor 13 is a stepper motor that drives the second hand 3, and the second motor 14 is a stepper motor that drives the minute hand 4 and hour hand 5. Note that the first motor 13 and second motor 14 are examples of stepper motors according to the disclosure.

Note also that IC is an abbreviation for integrated circuit.

The timekeeping chip 20 has connection terminals OSC1 and OSC2 to which the crystal oscillator 14 is connected; input/output terminals P1 to P3 to which switches SW1 to DW3 are connected; power supply terminals VDD and VSS to which the battery 12 is connected; output terminals O1 and O2 connected to the first motor 13; and output terminals O3 and O4 connected to the second motor 14.

Note that in this embodiment the positive pole of the battery 12 connects to the power supply terminal VDD on the high potential side, the negative pole connects to the power supply terminal VSS on the low potential side, and the power supply terminal VSS on the low potential side is set to a reference potential.

The crystal oscillator 11 is driven by an oscillation circuit 21 described below and produces an oscillation signal.

The battery 12 is a primary battery or a storage battery. If a storage battery, the battery 12 may be charged by solar cell not shown, for example.

Motor Configuration

Figure 3:
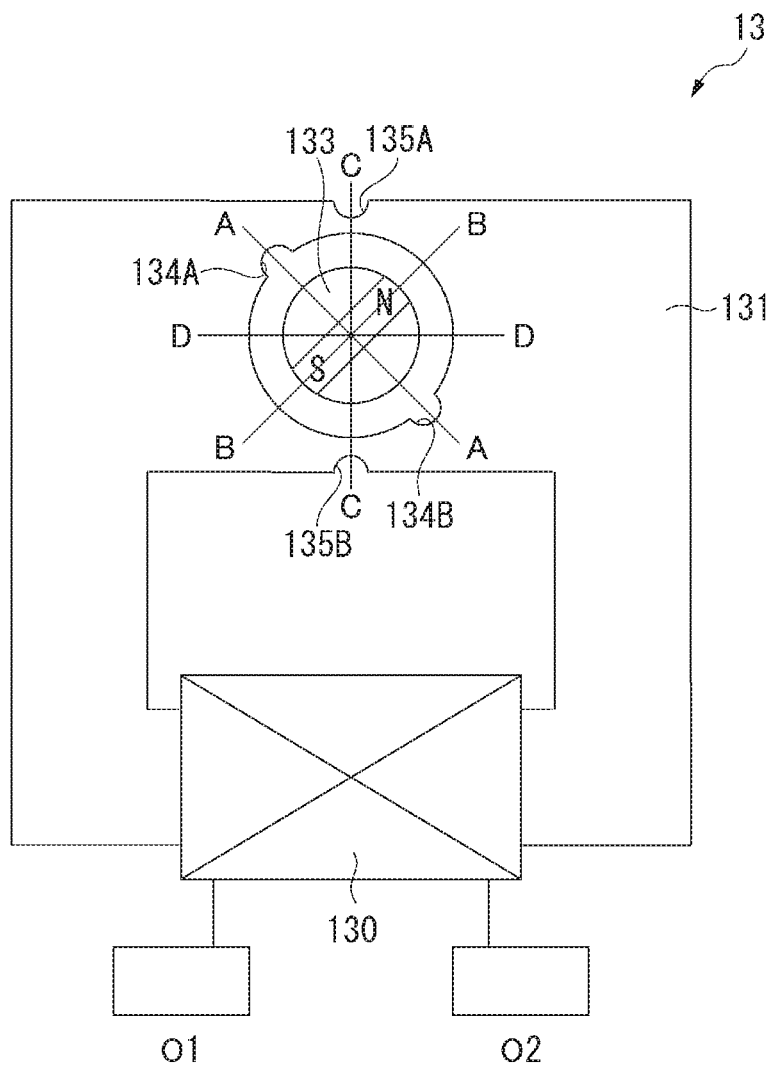
FIG. 3 shows the configuration of a first motor in the electronic timepiece according to the first embodiment.

FIG. 3 shows the configuration of the first motor 13. The configuration of the second motor 14 is the same as the configuration of the first motor 13, and further description thereof is omitted.

As shown in FIG. 3, the first motor 13 has a stator 131, a coil 130, and a rotor 133. The ends of the coil 130 have continuity with the output terminals O1 and O2 of the driver 50 described below. The rotor 133 is a magnet magnetized with two poles in the radial direction. The first motor 13 is therefore a two pole, single phase stepper motor used in electronic timepieces, and as described below is driven by motor drive current output from the output terminals O1 and O2 of the timekeeping chip 20.

Note that in this embodiment the rotor 133 turns forward in the counterclockwise direction, and in reverse in the clockwise direction. In other words, the counterclockwise direction is the forward, and the clockwise direction is the reverse direction.

Note that in this embodiment the first motor 13 connects through an intermediate wheel not shown to the fourth wheel not shown to which the second hand 3 is connected. When looking at the electronic timepiece 1 in plan view from the crystal side, that is, in a plan view as shown in FIG. 1, the direction in which the second hand 3 turns clockwise is the forward direction. In addition, the direction in which the wheels that drive the second hand 3 turn to drive the second hand 3 clockwise is the forward direction.

In this embodiment of the disclosure, when looking at the electronic timepiece 1 in plan view from the crystal side, when the minute hand 4 turns forward, the rotor 133 turns clockwise.

However, the operation of the rotor 133 is described herein as seen in plan view from the back cover side of the electronic timepiece 1. More specifically, when the second hand 3 turns clockwise as seen in plan view from the crystal side, the rotor 133 turns counterclockwise as seen in plan view from the back cover side.

Note that the wheels connecting the rotor 133 and second hand 3 are not limited to the configuration described above, and the rotor 133 and fourth wheel may be connected through two or more wheels. In addition, when the rotor 133 and fourth wheel connect through two wheels, and the second hand 3 turns clockwise as seen in plan view from the crystal side, the rotor 133 turns clockwise as seen in plan view from the back cover side.

A pair of inside notches 134A and 134B are disposed at opposing radial positions on the inside circumference of the hole housing the rotor in the stator 131. The rotor 133 works to maintain a stopped position where it is statically stable with the line B-B through the north and south poles of the rotor 133 perpendicular to the line A-A through these inside notches 134A and 134B.

More specifically, when a magnetic field for driving the rotor 133 is not produced in the coil 130, the rotor 133 is pulled to a statically stable position where the line through the north and south poles of the rotor 133 is perpendicular to line A-A.

In this embodiment, the position of the rotor 133 shown in FIG. 3 is an example of a first statically stable position, and the position where the rotor 133 is rotated 180 degrees from the position shown in FIG. 3 is an example of a second statically stable position.

A pair of external notches 135A and 135B is also disposed to the stator 131 with the rotor 133 therebetween. When the coil 130 is energized, the rotor 133 is held at a stopped position where the line B-B through the north and south poles is perpendicular to the line C-C through these external notches 135A and 135B, that is, with the line B-B through the north and south poles aligned with line D-D.

More specifically, when a magnetic field for driving the rotor 133 is produced in the coil 130, the rotor 133 is pulled to a dynamically stable position where the line B-B through the north and south poles is perpendicular to line C-C.

Circuit Configuration of the Timekeeping Chip

Figure 4:
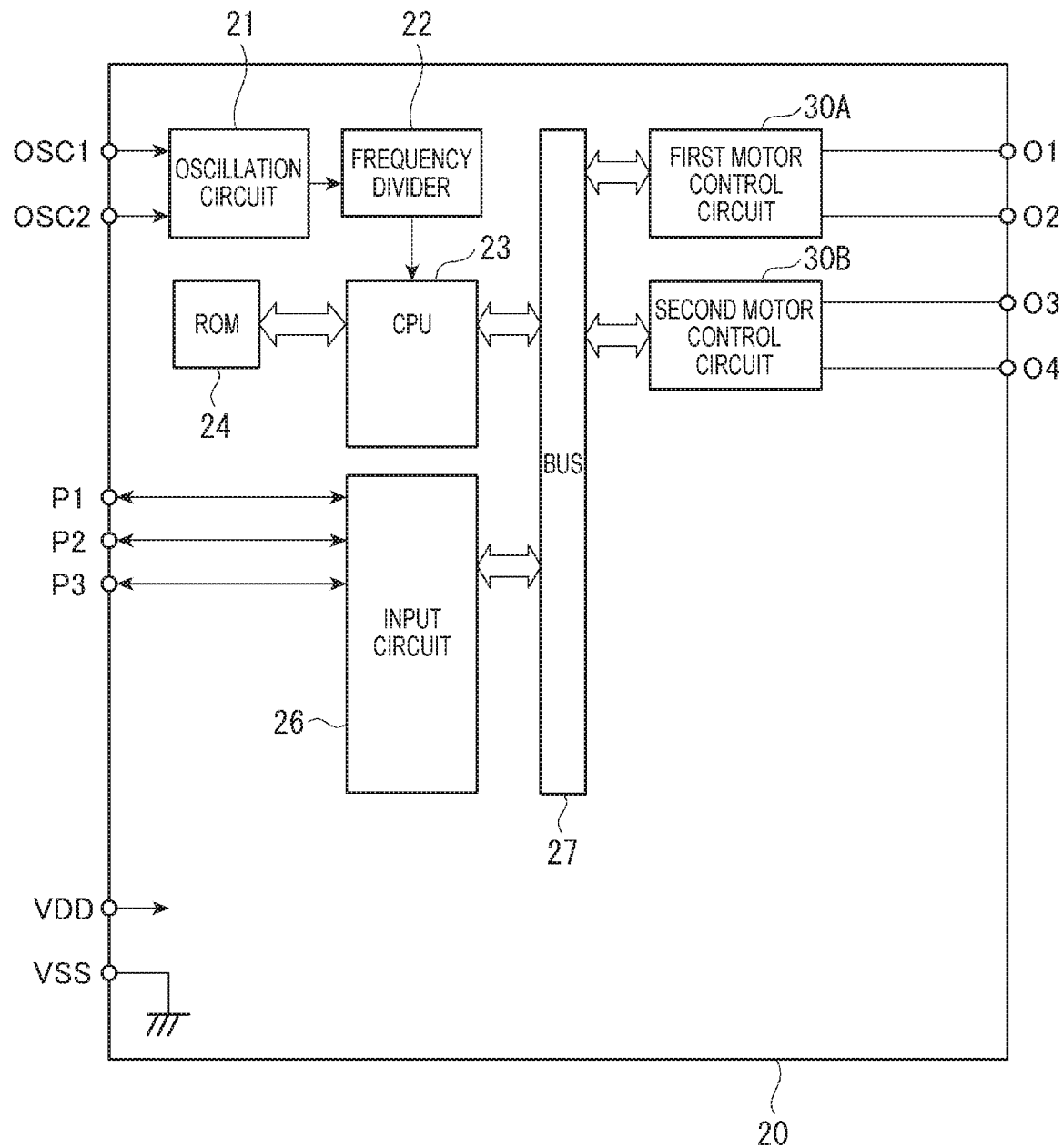
FIG. 4 illustrates the configuration of an IC chip in the electronic timepiece according to the first embodiment.

FIG. 4 shows the configuration of the timekeeping chip 20.

As shown in FIG. 4, the timekeeping chip 20 includes an oscillation circuit 21, frequency divider 22, a CPU 23 for controlling the electronic timepiece 1, ROM 24, an input circuit 26, a bus 27, a first motor control circuit 30A, and a second motor control circuit 30B.

The first motor control circuit 30A and second motor control circuit 30B are examples of a timepiece motor control circuit according to the disclosure.

Note that CPU is an abbreviation for central processing unit, and ROM is an abbreviation for read-only memory.

The oscillation circuit 21 causes the crystal oscillator 11, which is a reference signal source shown in FIG. 2, at a high frequency, and outputs an oscillation signal at a specific frequency (32768 Hz) produced by the high frequency oscillation to the frequency divider 22.

The frequency divider 22 frequency divides the output of the oscillation circuit 21, and supplies a timing signal to the CPU 23.

The ROM 24 stores programs executed by the CPU 23. In this embodiment, the ROM 24 stores, for example, a program for executing a basic timekeeping function.

The CPU 23 executes programs stored in the ROM 24 to execute specific functions.

The input circuit 26 outputs the state of the input/output terminals P1 to P3 to the bus 27. The bus 27 is used for data transfers between the CPU 23, input circuit 26, first motor control circuit 30A, and second motor control circuit 30B.

The first motor control circuit 30A and second motor control circuit 30B output specific drive signals according to commands input from the CPU 23 through the bus 27.

First Motor Control Circuit Configuration

Figure 5:
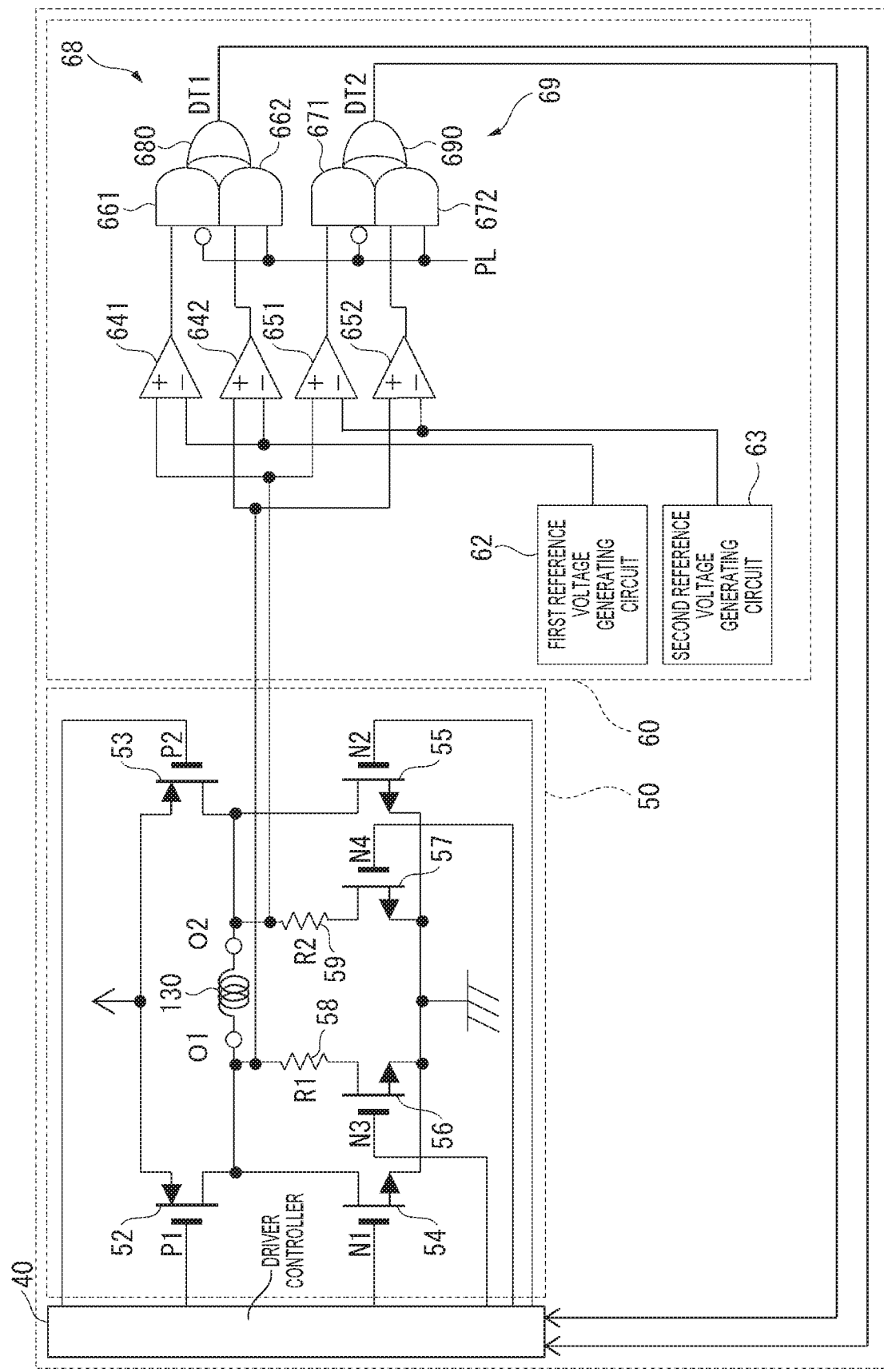
FIG. 5 is a circuit diagram showing the configuration of a first motor control circuit in the first embodiment.

FIG. 5 is a circuit diagram showing the configuration of the first motor control circuit 30A. The configuration of the second motor control circuit 30B is the same as the configuration of the first motor control circuit 30A, and further description thereof is omitted.

The first motor control circuit 30A includes a driver controller 40, the driver 50, and a current detection circuit 60.

The driver controller 40 outputs to the driver 50 a drive signal to drive the rotor 133 shown in FIG. 3. In this embodiment the driver controller 40 comprises a decoder, timer, differentiator, SR latch circuit, flip-flop, AND circuit, OR circuit, and is configured as a logic circuit that outputs gate signals P1, P2, N1, N2, N3, N4 to the driver 50. However, the configuration of the driver controller 40 is not limited to this configuration, and may be configured by a control device such as a CPU, or configured to directly control the transistors 52 to 57 of the driver 50 described below through the bus 27.

The driver 50 includes two p-channel transistors 52, 53, four n-channel transistors 54, 55, 56, 57, and two detection resistors 58, 59. The transistors 52 to 57 are controlled by drive signals output from the driver controller 40, and supply both forward and reverse currents I to the coil 130 of the first motor 13.

The current detection circuit 60 includes a first reference voltage generating circuit 62, a second reference voltage generating circuit 63, comparators 641, 642, 651, 652, and complex gates 68, 69.

Figure 6:
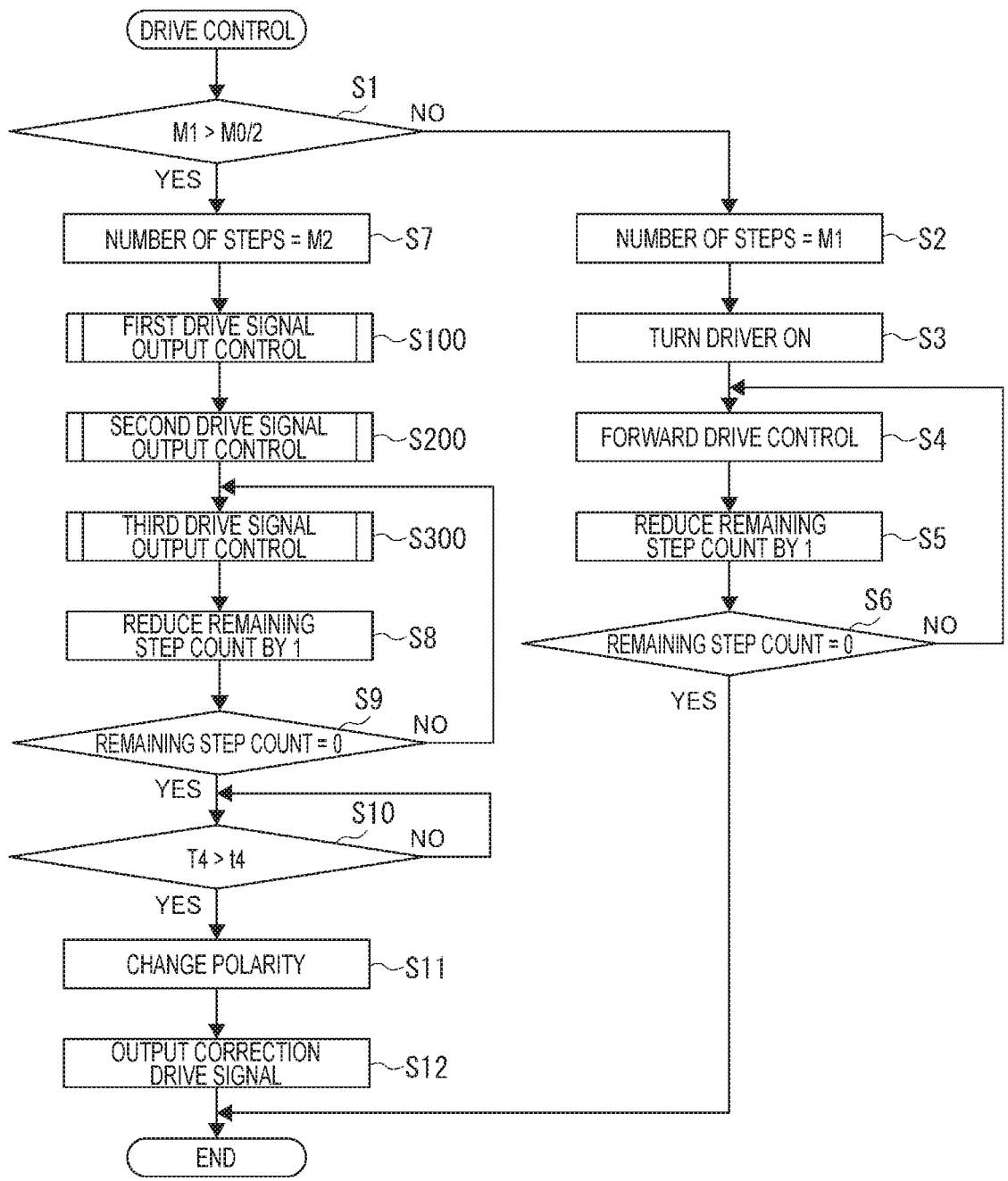
FIG. 6 is a flow chart describing the motor control process in the first embodiment.

Complex gate 68 is a single element comprising the same functions as a combination of the AND circuits 661, 662, and OR circuit 680 shown in FIG. 6.

Complex gate 69 is a single element comprising the same functions as a combination of the AND circuits 671, 672, and OR circuit 690.

The current detection circuit 60 is an example of a current detector in the accompanying claims.

Comparators 641, 642 compare the voltages produced at the ends of the detection resistors 58, 59 of resistances R1, R2, and the voltage of the first reference voltage generating circuit 62.

Because the drive polarity signal PL is inverted and input to AND circuit 661, and the drive polarity signal PL is input without inversion to the AND circuit 662, the output of the comparators 641 and 642 selected based on the drive polarity signal PL is output as the output DT1.

The comparators 651 and 652 compare the voltages produced at the ends of the detection resistors 58, 59 of resistances R1, R2, and the voltage of the second reference voltage generating circuit 63.

Because the drive polarity signal PL is input inverted to AND circuit 671, and the drive polarity signal PL is input without inversion to the AND circuit 672, the output of the comparators 651 and 652 selected according to the drive polarity signal PL is output as output DT2.

The first reference voltage generating circuit 62 is configured to output a potential equivalent to the voltage produced at the ends of the detection resistors 58, 59 when the current I flow through the coil 130 is minimum current Imin.

Therefore, when the current I flowing through the coil 130 is greater than or equal to minimum current Imin, the voltage produced at the ends of the detection resistors 58, 59 exceeds the output voltage of the first reference voltage generating circuit 62, and the detection signal DT1 goes High. However, when the current I is less than minimum current Imin, the detection signal DT1 goes Low.

As a result, the first reference voltage generating circuit 62, the comparators 641 and 642, and the complex gate 68 of the current detection circuit 60 are configured to detect when the current I flowing through the coil 130 is less than minimum current Imin.

The second reference voltage generating circuit 63 produces a voltage equivalent to maximum current Imax. Therefore, the output DT2 of the current detection circuit 60 goes High when the current I flowing through the coil 130 exceeds the maximum current Imax, and is Low when the current I is less than or equal to the maximum current Imax.

As a result, the second reference voltage generating circuit 63, the comparators 651 and 652, and the complex gate 69 of the current detection circuit 60 are configured to detect when the current I flowing through the coil 130 exceeds the maximum current Imax.

Control Process of the Motor Control Circuit

Control by the first motor control circuit 30A in this embodiment of the disclosure is described next with reference to the flow chart in FIG. 6.

The control method used to quickly advance the second hand 3 to the 0 position when the A button 7 is pushed for three or more seconds to select the stopwatch mode, that is, a control method used to move the second hand 3 quickly, is described below.

Operation of the Motor Control Circuit

When the stopwatch mode is set, the CPU 23 of the timekeeping chip 20 calculates, in step S1, the number of steps M1 required to move the second hand 3 in the forward direction, that is, move the second hand 3 clockwise, to the 0 second position.

In this embodiment, the second hand 3 indicates the second in 60 divisions in one revolution. More specifically, the number of steps M0 required for the second hand 3 to turn one revolution is 60 steps. The CPU 23 sets the count C to 0 when second hand 3 is at the 0 second position, and increments the count C by 1 each time the second hand 3 advances one step. In other words, the CPU 23 increases the count C to 1 to 59 in conjunction with movement of the second hand 3. As a result, the CPU 23 obtains the number of steps M1 by subtracting the count C from 60.

The CPU 23 them determines whether or not the calculated number of steps M1 is greater than or equal to M0/2, that is, whether or not the number of steps M1 is greater than or equal to 60/2 or 30 steps. In other words, the CPU 23 determines whether or not the second hand 3 is at a position from 0 to 29 seconds.

Note that the disclosure is not limited to the foregoing, and the CPU 23 may evaluate the position of the second hand 3 by determining whether or not the count C is less than 30.

If step S1 returns No, that is, if M1 is determined to be less than or equal to 30 steps, the second hand 3 is at a position from 30 to 59 seconds, moving the secondhand 3 clockwise enables moving to the 0 second position with fewer steps than moving the second hand 3 counterclockwise. As a result, in step S2, the CPU 23 outputs to the driver controller 40 a signal setting the number of steps required to move the rotor 133 in the forward direction as M1.

When M1 is set to the step count by the setting signal, the driver controller 40, in step S3, turns the driver 50 of the first motor 13 on by means of gate signals P1, P2, N1, N2, N3, N4.

Note that in the flow chart and following description, turning the driver 50 on means controlling the driver 50 to anon state in which drive current can flow to the coil 130, and turning the driver 50 off means controlling the driver 50 to an off state in which drive current cannot flow to the coil 130.

Next, in step S4, forward drive control is applied by the driver controller 40. Note that while detailed description of forward drive control is omitted, in forward drive control the driver controller 40 moves the second hand 3 by driving the second hand 3 rapidly.

In step S5 the remaining step count is reduced by one in each step, and the driver controller 40, in step S6, determines whether or not the remaining step count is 0. If step S6 returns No, control returns to step S4.

If step S6 returns Yes, the rotor 133 has turned the number of steps M1 set in step S2, and the process therefore ends.

Returning to step S1, if step S1 returns Yes, that is, if M1 is determined to be greater than 30 steps, the second hand 3 is at a position from 0 to 29 seconds, and moving the second hand 3 counterclockwise enables moving to the 0 second position with fewer steps than moving the second hand 3 clockwise. As a result, in step S7, the CPU 23 outputs to the driver controller 40 a signal setting the number of steps required to move the rotor 133 in the reverse direction as M2. Note that in this embodiment M2 is (60−M1).

The CPU 23 then outputs a signal causing the driver controller 40 to execute reverse drive control to turn the rotor 133 in the reverse direction, which is the opposite direction as the forward direction.

Reverse Drive Control

Figure 7:
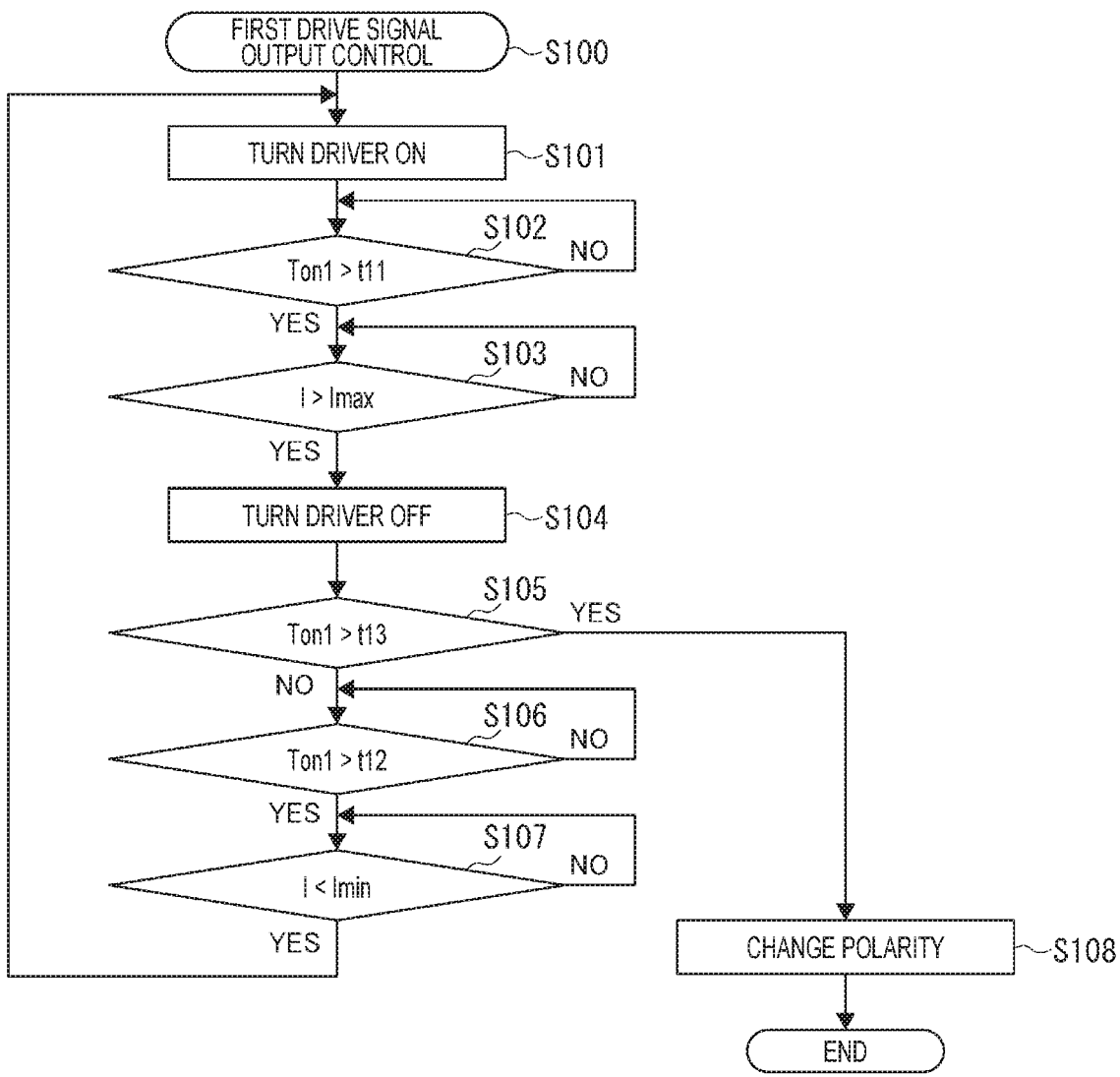
FIG. 7 is a flow chart describing a process of outputting a first drive signal in the first embodiment.
Figure 8:
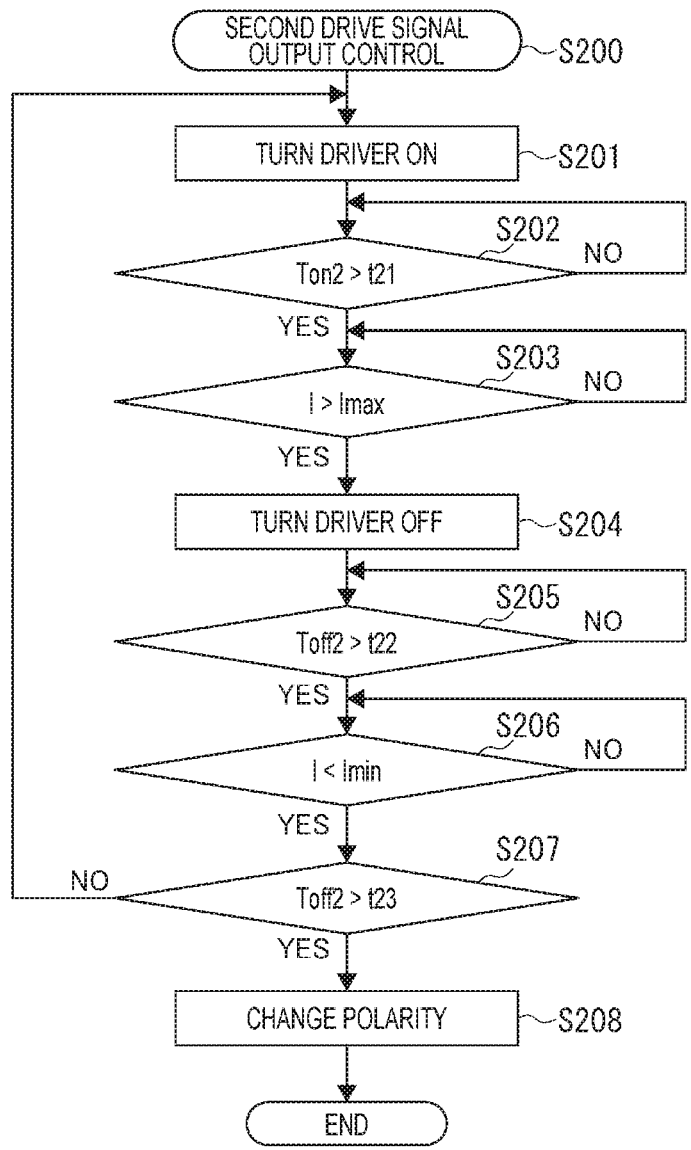
FIG. 8 is a flow chart describing a process of outputting a second drive signal in the first embodiment.
Figure 9:
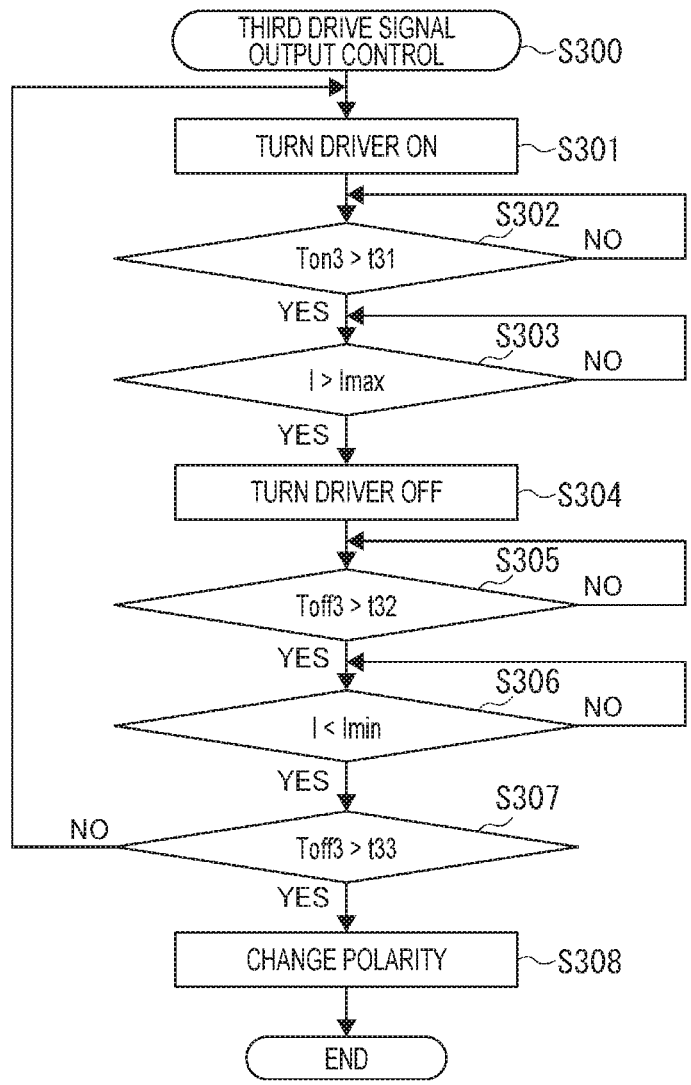
FIG. 9 is a flow chart describing a process of outputting a third drive signal in the first embodiment.
Figure 10:
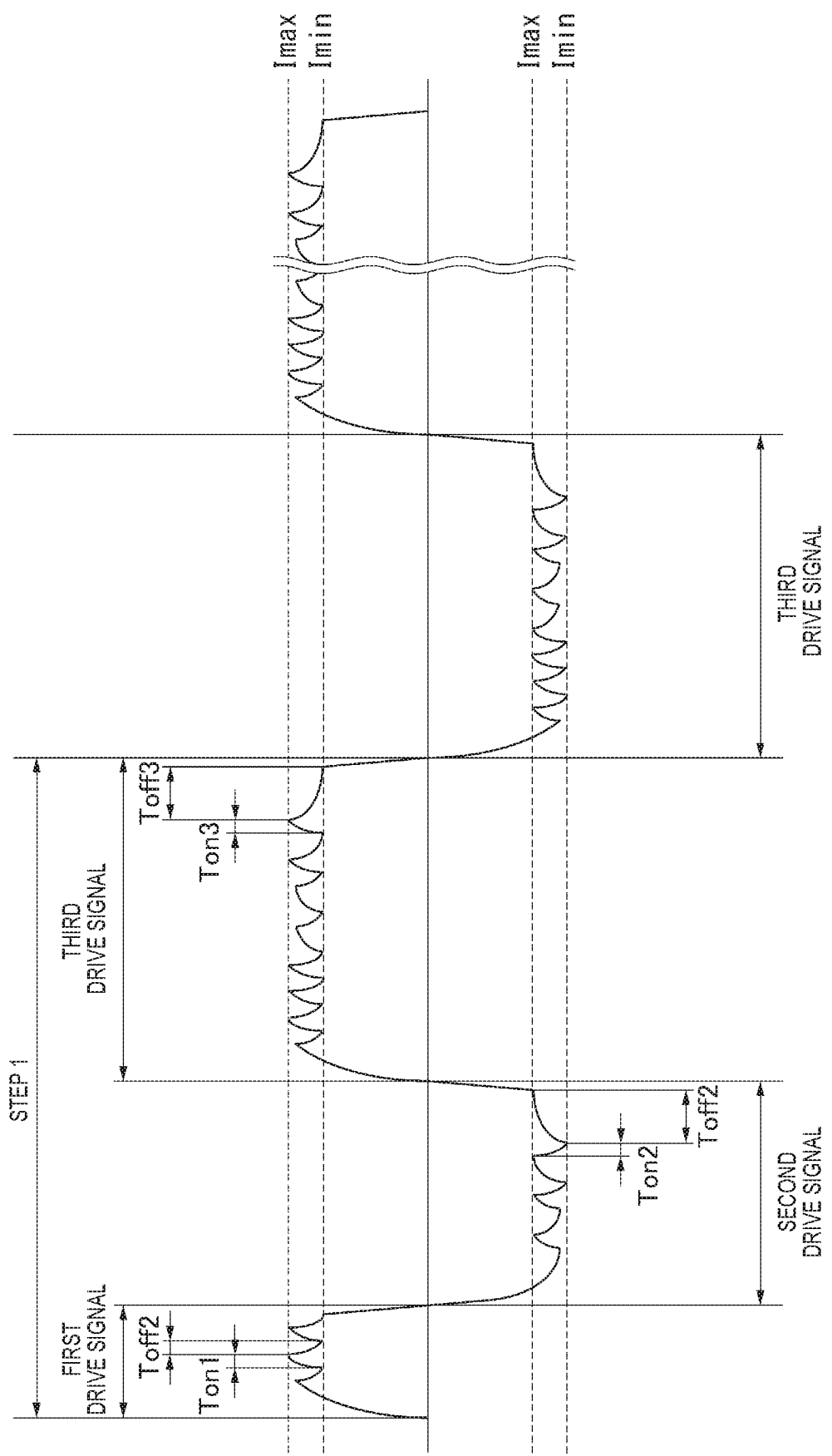
FIG. 10 shows the signal waveforms of the first to third drive signals in the reversing control process.

FIG. 7 is a flow chart describing first drive signal output control, FIG. 8 is a flow chart describing second drive signal output control, and FIG. 9 is a flow chart describing third drive signal output control, in the reverse drive control process according to this embodiment. FIG. 10 shows the signal waveforms of the first to third drive signals in the reverse drive control process. In this embodiment the driver controller 40 drives the second hand 3 in reverse rapidly.

Figure 11:
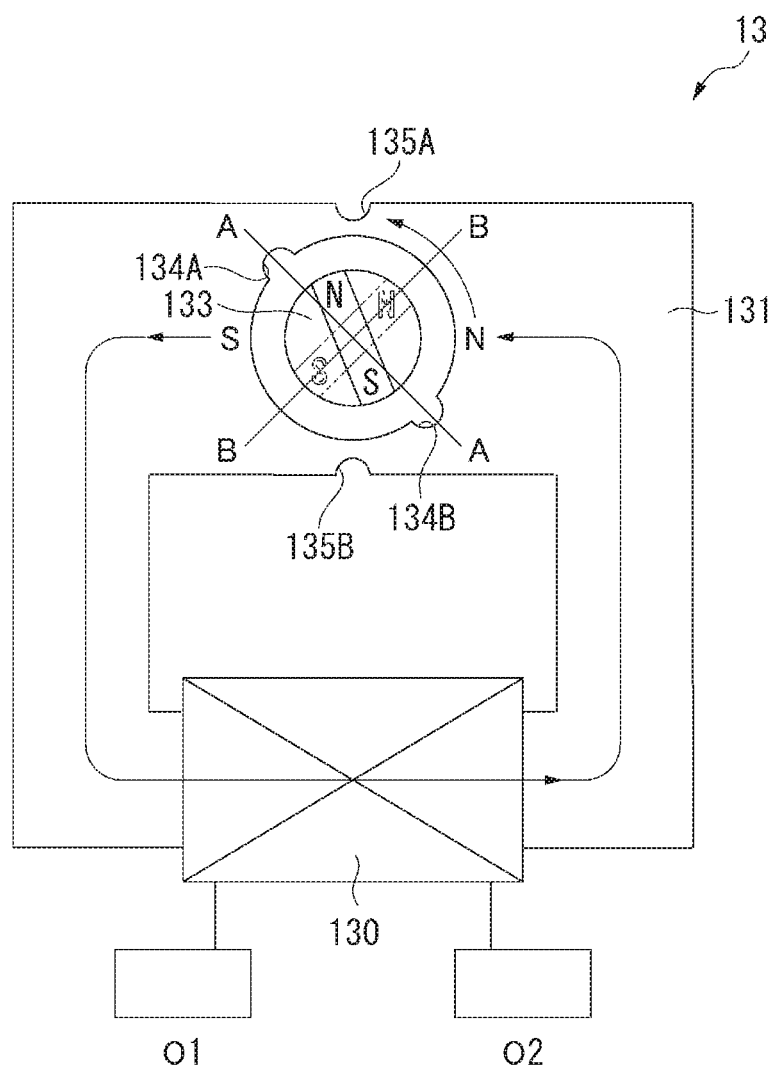
FIG. 11 illustrates rotation of the rotor driven by the first drive signal.
Figure 12:
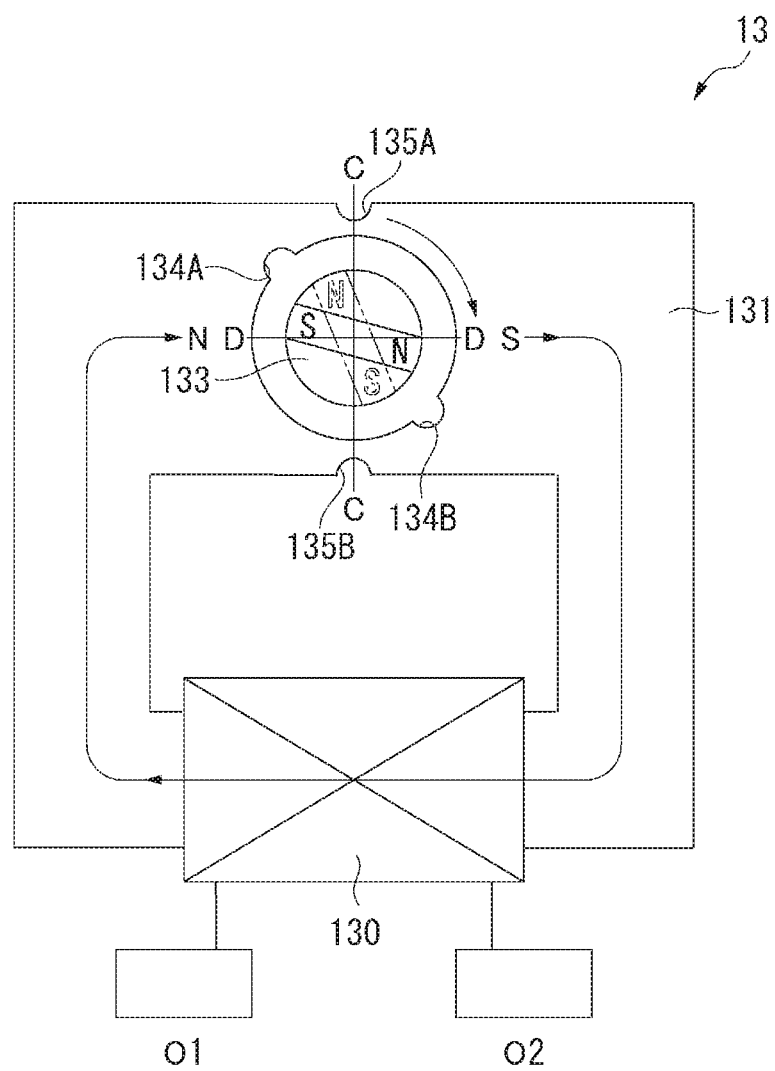
FIG. 12 illustrates rotation of the rotor driven by the second drive signal.
Figure 13:
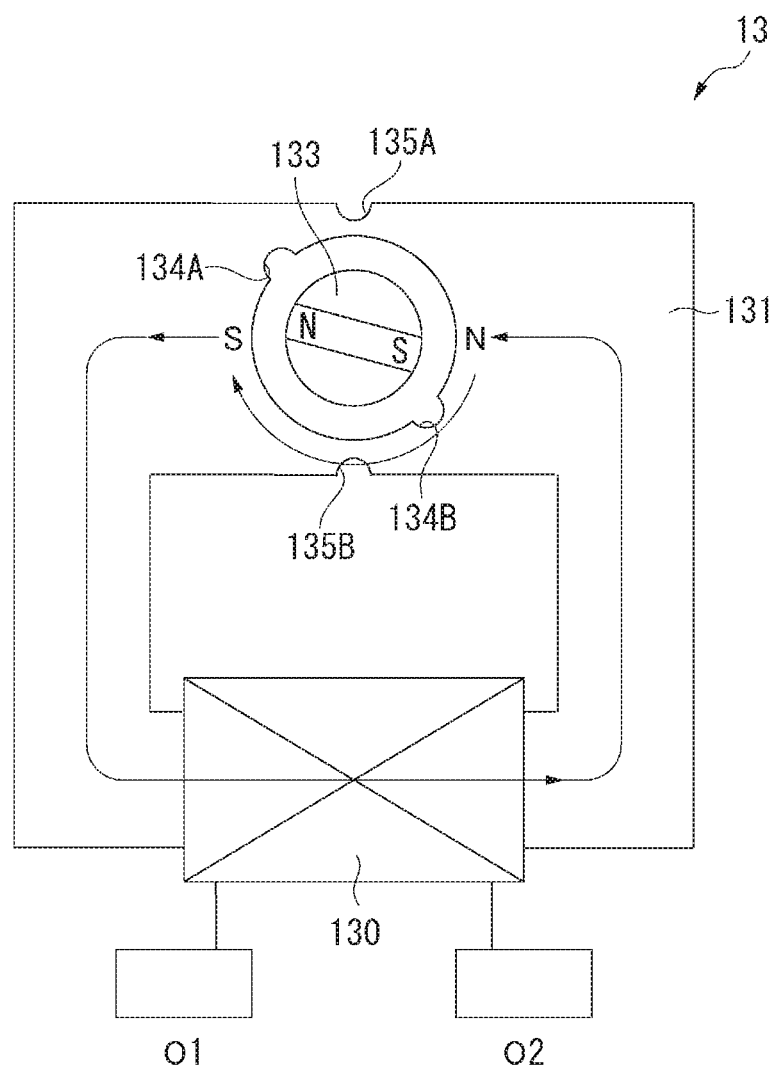
FIG. 13 illustrates rotation of the rotor driven by the third drive signal.

FIG. 11 illustrates the rotor 133 turning according to the first drive signal, FIG. 12 illustrates the rotor 133 turning according to the second drive signal, and FIG. 13 illustrates the rotor 133 turning according to the third drive signal.

As shown in FIG. 7, when the first drive signal output control S100 is executed, the driver controller 40, in step S101, turns the driver 50 of the first motor 13 on by means of gate signals P1, P2, N1, N2, N3, N4. More specifically, outputting the first drive signal starts.

In this embodiment, when the driver 50 turns on, P1 goes Low, P2 goes High, p-channel transistor 52 turns on, and p-channel transistor 53 turns off. In addition, N1 to N3 go Low, N4 goes High, n-channel transistors 54, 55, 56 turn off, and n-channel transistor 57 turns on. As a result, drive current flows through p-channel transistor 52, terminal O1, coil 130, terminal O2, detection resistor 59, and n-channel transistor 57.

Next, the driver controller 40, in step S102, determines whether or not first on time Ton1, which is the time the driver 50 remains continuously on in response to the first drive signal, exceeds specific time t11. If step S102 returns No, the driver controller 40 repeats the process of step S102.

Note that the specific time t11 is set to a time that minimizes turning the driver 50 on in order to suppress consumption current increasing due to the through current and charge/discharge current resulting from the driver 50 frequently turning on and off.

If step S102 returns Yes, the current detection circuit 60, in step S103, determines whether or not the current I flowing through the coil 130 exceeds a maximum current Imax.

If step S103 returns No, the current detection circuit 60 repeats the evaluation process of step S103 until the current I exceeds maximum current Imax, that is, until the voltage produced in detection resistors 58, 59 exceeds the reference voltage of the first reference voltage generating circuit 62.

However, if step S103 returns Yes, the driver controller 40, in step S104, turns the driver 50 off by means of gate signals P1, P2, N1, N2, N3, N4. More specifically, P1 goes High, P2 goes High, N1 goes High, N2 goes Low, N3 goes High, and N4 goes High. As a result, the ends of the coil 130 are connected to the power supply terminal VSS and shorted, and the supply of current I from the driver 50 to the coil 130 stops. Therefore, the state in which current is not supplied to the coil 130 is a state in which the driver 50 is controlled to an off state.

Next, the driver controller 40, in step S105, determines whether or not the first on time Ton1 exceeds specific time t13.

If step S105 returns No, the driver controller 40, in step S106, determines whether or not first off time Toff1, which is the time the driver 50 remains continuously off in response to the first drive signal, exceeds specific time t12. If step S106 returns No, the driver controller 40 repeats the process of step S106.

Note that, similarly to specific time t11, specific time t12 is set to a time that minimizes turning the driver 50 off in order to suppress the driver 50 frequently turning on and off.

If step S106 returns Yes, the current detection circuit 60, in step S107, determines whether or not the current I through the coil 130 is less than a minimum current Imin.

If step S107 returns No, the current detection circuit 60 repeats the evaluation process of step S107 until the current I goes below the minimum current Imin, that is, until the voltage produced in detection resistors 58, 59 goes below the reference voltage of the second reference voltage generating circuit 63.

If step S107 returns Yes, control returns to step S101, and the process of step S101 to step S107 repeats.

However, if step S105 returns Yes, the driver controller 40 changes polarity in step S108.

A first drive signal with a waveform as shown in FIG. 10 is output by the above process of step S101 to step S108.

As described above, the driver controller 40 in this embodiment outputs a first drive signal according to the current value detected by the current detection circuit 60. More specifically, the driver controller 40 turns the driver 50 on and off according to the current I, and changes the polarity, that is, switches from the first drive signal to a second drive signal, at a first on time Ton1 based on the current I.

As shown in FIG. 11, in the state in which the first drive signal is output, the driver controller 40 supplies current producing a counterclockwise magnetic field in the stator 131. As a result, the rotor 133 turns counterclockwise, that is, in the forward direction, from the first statically stable position.

In this event, the specific time t13 described above is set so that the line through the north and south poles of the rotor 133 passes the midpoint of line A-A in FIG. 11, or more specifically the midpoint between the first statically stable position and the second statically stable position, and the rotor 133 does not turn. In other words, the first drive signal is a drive signal that pulls the rotor 133 in the forward direction from the position where the rotor 133 is held at the first statically stable position to a position where the rotor 133 is not held at the second statically stable position. As a result, when the polarity changes in step S108, an inertial force works to turn the rotor 133 clockwise, that is, in the reverse direction.

In this embodiment as described above, the driver controller 40 changes from the first drive signal to the second drive signal based on a first on time Ton1 corresponding to the current I detected by the current detection circuit 60. Because the driver controller 40 estimates the position of the rotor 133 and changes from the first drive signal to the second drive signal according to the first on time Ton1, the rotor 133 can be reliably turned in the forward direction to a position not at the second statically stable position.

As shown in FIG. 8, when the second drive signal output control S200 is executed, the driver controller 40, in step S201, turns the driver 50 on. More specifically, outputting the second drive signal starts.

Because the polarity changed in step S108, when the driver 50 turns on, P1 goes High, P2 goes Low, N1, N2, N4 go Low, and N3 goes High. As a result, p-channel transistor 52 turns off, and p-channel transistor 53 turns on. In addition, n-channel transistors 54, 55, 57 turn off, and n-channel transistor 56 turns on. As a result, current I flows through p-channel transistor 53, terminal O2, coil 130, terminal O1, detection resistor 58, and n-channel transistor 56. In this case, the second drive signal causes current I to flow in the opposite direction as the first drive signal described above.

Next, the driver controller 40, in step S202, determines whether or not second on time Ton2, which is the time the driver 50 remains continuously on in response to the second drive signal, exceeds specific time t21.

Note that like specific time t11, the specific time t21 is set to a time that minimizes turning the driver 50 on.

If step S202 returns No, the driver controller 40 repeats the process of step S202.

If step S202 returns Yes, the current detection circuit 60, in step S203, executes the same process as described in step S103 above.

If step S203 returns No, the current detection circuit 60 repeats the evaluation process of step S203 until the current I exceeds the maximum current Imax.

However, if step S203 returns Yes, the driver controller 40, in step S204, turns the driver 50 off by means of gate signals P1, P2, N1, N2, N3, N4. More specifically, when the driver 50 turns off, P1 goes High, P2 goes High, N1 goes Low, N2 goes High, N3 goes High, and N4 goes High. In other words, p-channel transistors 52, 53 and n-channel transistor 54 turn off, and n-channel transistors 55, 56, 57 turn on. As a result, the ends of the coil 130 are connected to the power supply terminal VSS and shorted, and the supply of current I from the driver 50 to the coil 130 stops.

Next, the driver controller 40, in step S205, determines whether or not the second off time Toff2, which is the time the driver 50 remains continuously off in response to the second drive signal, exceeds specific time t22.

Note that, similarly to specific time t12, specific time t22 is set to a time that minimizes turning the driver 50 off.

If step S205 returns No, the driver controller 40 repeats the process of step S205.

If step S205 returns Yes, the current detection circuit 60 executes in step S206 the same process as step S107 described above.

If step S206 returns No, the current detection circuit 60 repeats the evaluation process of step S206 until the current I goes below the minimum current Imin.

If step S206 returns Yes, the driver controller 40 determines in step S207 whether or not the second off time Toff2 exceeds specific time t23.

If step S207 returns No, control returns to step S201, and the process of step S201 to step S207 repeats.

However, if step S207 returns Yes, the driver controller 40 changes the polarity in step S208.

A second drive signal with a waveform as shown in FIG. 10 is output by the above process of step S201 to step S208.

As described above, the driver controller 40 in this embodiment outputs a second drive signal according to the current value detected by the current detection circuit 60. More specifically, the driver controller 40 turns the driver 50 on and off according to the current I, and changes the polarity, that is, switches from the second drive signal to a third drive signal, at a second off time Toff2 based on the current I.

As shown in FIG. 12, in the state in which the second drive signal is output, a clockwise magnetic field is produced in the stator 131. As a result, the rotor 133 turns clockwise, that is, in the reverse direction.

In this event, the specific time t23 described above is set so that the line through the north and south poles of the rotor 133 turns past line D-D in FIG. 12, or more specifically past the dynamically stable position. In other words, the second drive signal is a drive signal causing the rotor 133 to rotate in the reverse direction past the dynamically stable position.

In this case, when the rotor 133 is at the first statically stable position, that is, is positioned with the line through the north and south poles of the rotor 133 aligned with line B-B in FIG. 11, and the second drive signal is output, the distance from the first statically stable position to the dynamically stable position shown in FIG. 12 is short. As a result, the inertial force when the rotor 133 turns from the first statically stable position to the dynamically stable position is weak, and rotation past the dynamically stable position is difficult.

In contrast, in this embodiment as described above, when the second drive signal is output with inertial force working in the reverse direction after the rotor 133 rotates in the forward direction to a position not exceeding a neutral point in response to the first drive signal, the rotor 133 is pulled in the reverse direction. As a result, the rotor 133 can rotate past the dynamically stable position due to the strong inertial force working in the reverse direction.

In this embodiment as described above, the driver controller 40 changes from the second drive signal to the third drive signal based on a second off time Toff2 corresponding to the detected current I. Because the driver controller 40 estimates the position of the rotor 133 and changes from the second drive signal to the third drive signal according to the second off time Toff2, the rotor 133 can be reliably rotated past the dynamically stable position.

As shown in FIG. 9, when the third drive signal output control S300 is executed, the driver controller 40, in step S301, turns the driver 50 on. More specifically, outputting the third drive signal starts.

Because the polarity changed in step S208, the driver 50 goes to the same state as in step S101 described above.

Next, the driver controller 40, in step S302, determines whether or not third on time Ton3, which is the time the driver 50 remains continuously on in response to the third drive signal, exceeds specific time t31.

Note that like specific time t11, the specific time t31 is set to a time that minimizes turning the driver 50 on.

If step S302 returns, the driver controller 40 repeats the process of step S302.

If step S302 returns Yes, the current detection circuit 60 executes the same process in step S303 as in steps S103 and S203 above.

If step S303 returns No, the current detection circuit 60 repeats the evaluation process of step S303 until the current I exceeds the maximum current Imax.

However, if step S303 returns Yes, the driver controller 40 turns the driver 50 off in step S304 as in step S104 described above.

Next, the driver controller 40, in step S305, determines whether or not the third off time Toff3, which is the time the driver 50 remains continuously off in response to the third drive signal, exceeds specific time t32.

Note that, similarly to specific time t12, specific time t32 is set to a time that minimizes turning the driver 50 off.

If step S305 returns No, the driver controller 40 repeats the process of step S305.

If step S305 returns Yes, the current detection circuit 60 executes in step S306 the same process as in step S107 and step S206.

If step S306 returns No, the current detection circuit 60 repeats the evaluation process of step S306 until the current I goes below the minimum current Imin.

If step S306 returns Yes, the driver controller 40 determines in step S307 whether or not the third off time Toff3 exceeds specific time t33.

If step S307 returns No, control returns to step S301, and the process of step S301 to step S307 repeats.

However, if step S307 returns Yes, the driver controller 40 changes the polarity in step S308.

As described above, the driver controller 40 in this embodiment outputs a third drive signal according to the current value detected by the current detection circuit 60. More specifically, the driver controller 40 turns the driver 50 on and off according to the current I, and changes the polarity, that is, stops outputting the third drive signal, at a third off time Toff3 based on the current I.

As shown in FIG. 13, in the state in which the third drive signal is output, a counterclockwise magnetic field is produced in the stator 131. As a result, the rotor 133 turns clockwise, that is, in the reverse direction.

In this embodiment as described above, the driver controller 40 stops outputting the third drive signal at a third off time Toff3 based on the current I. More specifically, the driver controller 40 estimates the position of the rotor 133 and changes the polarity of the third drive signal based on the third off time Toff3, and can therefore reliably cause the rotor 133 to turn in the reverse direction.

Note that when the polarity changes and the third drive signal is output from the state shown in FIG. 13, a clockwise magnetic field is produced in the stator 131.

Returning to FIG. 6, after the third drive signal output control S300 ends, the driver controller 40 reduces the remaining step count by one in step S8.

In step S9 the driver controller 40 determines whether or not the remaining step count is 0.

If step S9 returns No, the process of step S300 repeats. More specifically, the driver controller 40 outputs the third drive signal of step count M2 according to the targeted rotation of the rotor 133.

If step S9 returns Yes, the driver controller 40, in step S10, determines whether or not the time T4 past from output of the last third drive signal of the specified number of steps M2 exceeds a specific time t4.

Note that the specific time t4 is set to a time enabling reliably braking the rotor 133, and in this embodiment is set to approximately 10 msec.

If step S10 returns No, the driver controller 40 repeats step S10 until step S10 returns Yes.

If step S10 returns Yes, the driver controller 40 changes the polarity in step S11.

Next, the driver controller 40 outputs a correction drive signal in step S12.

Figure 14:
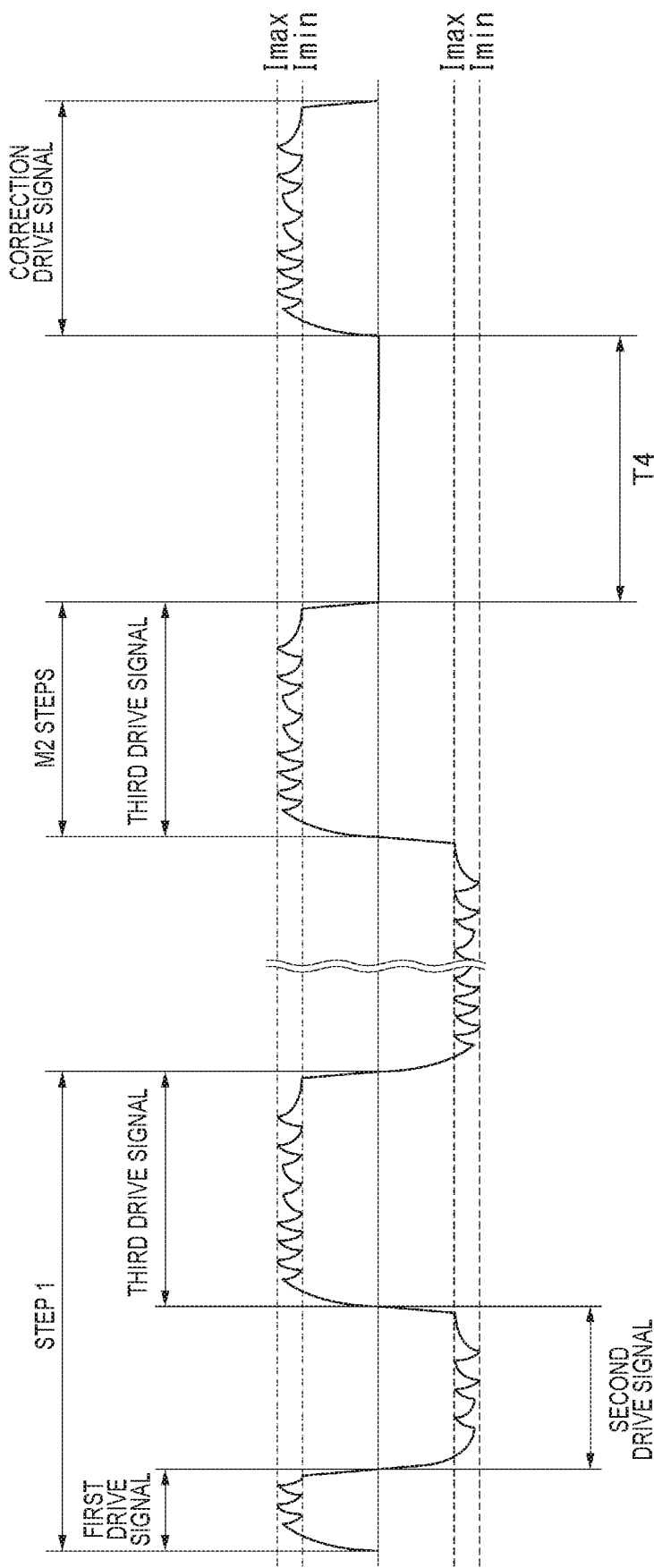
FIG. 14 shows the signal waveforms of the first to third drive signals and a correction drive signal.

FIG. 14 shows the signal waveforms of the first to third drive signals and the correction drive signal.

As shown in FIG. 14, the driver controller 40 outputs a correction drive signal of the same polarity as the last third drive signal in the specific number of steps M2. More specifically, the correction drive signal produces a magnetic field in the same direction as the magnetic field produced by the last third drive signal.

When the correction drive signal is output in step S12, drive control of the second hand 3 ends.

Effect of Embodiment 1

Effects of the first embodiment are described below.

The electronic timepiece 1 according to this embodiment of the disclosure has a driver controller 40 that outputs first to third drive signals to the driver 50 according to the current value detected by a current detection circuit 60. More specifically, the driver controller 40 turns the driver 50 on and off according to the current I detected by a current detection circuit 60, and changes polarity based on how long the driver 50 is continuously on or off.

The driver controller 40 outputs a first drive signal that causes the rotor 133 to turn from a position where the rotor 133 is held at a first statically stable position in a forward direction in which the rotor 133 is pulled to a second statically stable position. The driver controller 40 then outputs a second drive signal causing the rotor 133 to rotate in a reverse direction opposite the forward direction to pass a dynamically stable position. The driver controller 40 then outputs a third drive signal causing the rotor 133 to turn in the reverse direction.

As a result, the rotor 133 is driven by the first drive signal to rotate in a forward direction not passing a neutral point between the first statically stable position and second statically stable position, and while inertial force is working in the reverse direction on the rotor 133, outputs a second drive signal causing the rotor 133 to turn in the reverse direction. This second drive signal can therefore cause the rotor 133 to rotate past the dynamically stable position.

In addition, because a third drive signal causing the rotor 133 to turn in the reverse direction is output after the rotor 133 has past the dynamically stable position, the rotor 133 can be made to turn in the reverse direction. The first motor 13 can therefore be driven in the reverse direction when the first motor 13 is controlled by current.

Furthermore, because the driver controller 40 estimates the position of the rotor 133 and switches from the first drive signal to the second drive signal based on current I, the rotor 133 can be reliably made to turn in the forward direction but not pulled to the second statically stable position.

In addition, because the driver controller 40 estimates the position of the rotor 133 and switches from the second drive signal to the third drive signal based on current I, the rotor 133 can be made to turn reliably past the dynamically stable position.

Yet further, because the driver controller 40 estimates the position of the rotor 133 and changes the polarity of the third drive signal based on current I, the rotor 133 can be made to turn reliably in the reverse direction.

In this embodiment of the disclosure the driver controller 40 changes the drive signal output to the driver 50 from the second drive signal to the third drive signal after the second off time Toff2, which is the continuous time of the off state in response to the second drive signal, exceeds a specific time t23.

The driver controller 40 then stops outputting the third drive signal when the third off time Toff3, which is the continuous time of the off state in response to the third drive signal, exceeds a specific time t33.

In other words, the driver controller 40 estimates the position of the rotor 133 and changes the drive signal based on the second off time Toff2 and third off time Toff3. As a result, compared with when the drive signal is output for a predetermined time, that is, compared with outputting a fixed pulse, the rotor 133 can be stably reversed even when there is a load on the rotor 133 or there is an external disturbance.

In this embodiment of the disclosure the driver controller 40 outputs the third drive signal of a specific number of steps M2 corresponding to the targeted rotation of the rotor 133. As a result, the rotor 133 can be reversed a desired amount of rotation only. The first motor 13 can therefore be controlled to drive in reverse and move the second hand 3 to a desired position.

Furthermore, because the driver controller 40 does not output the first and second drive signals and outputs only the third drive signal for a specific number of steps M2 from the second step, current consumption can be reduced compared with outputting the first to third drive signals every step.

After outputting the last third drive signal, the driver controller 40 in this embodiment outputs a correction drive signal that produces a magnetic field in the same direction as the direction of the magnetic field produced by the last third drive signal of the specific number of steps M2.

As a result, because the rotor 133 is stopped at a position pulled in the direction of the magnetic field produced by the last third drive signal when the rotor 133 is operating normally, the rotor 133 does not turn and is held stopped even when a magnetic field in the same direction as the correction drive signal is produced.

However, if the rotor 133 overruns, that is, reverses one step too much, the rotor 133 stops in a position resisting the direction of the magnetic field produced by the last third drive signal. As a result, by producing a magnetic field in the same direction as the last third drive signal due to the correction drive signal, the rotor 133 can be driven one step in the forward direction and returned to the same position as when movement stops normally.

In this case, the driver controller 40 in this embodiment outputs the correction drive signal after specific time t4 passes, that is, after the rotor 133 stops completely, after the last third drive signal of the specific number of steps M2 is output. As a result, the correction drive signal causing the rotor 133 to turn more than the specific number of steps M2 can be prevented.

Embodiment 2

A second embodiment of the disclosure is described below with reference to FIG. 15 to FIG. 18. The second embodiment differs from the first embodiment described above by changing from the second drive signal to the third drive signal based on the second on time Ton2, and stopping output of the third drive signal based on the third on time Ton3. The second embodiment also differs from the first embodiment by outputting the first to third drive signals one step only when the specific time t4 has past after the remaining step count decreases to 1.

Note that configurations in the second embodiment that are the same or similar to configurations in the first embodiment are identified by like reference numerals, and further description thereof is omitted.

Control Process of the Motor Control Circuit

Figure 15:
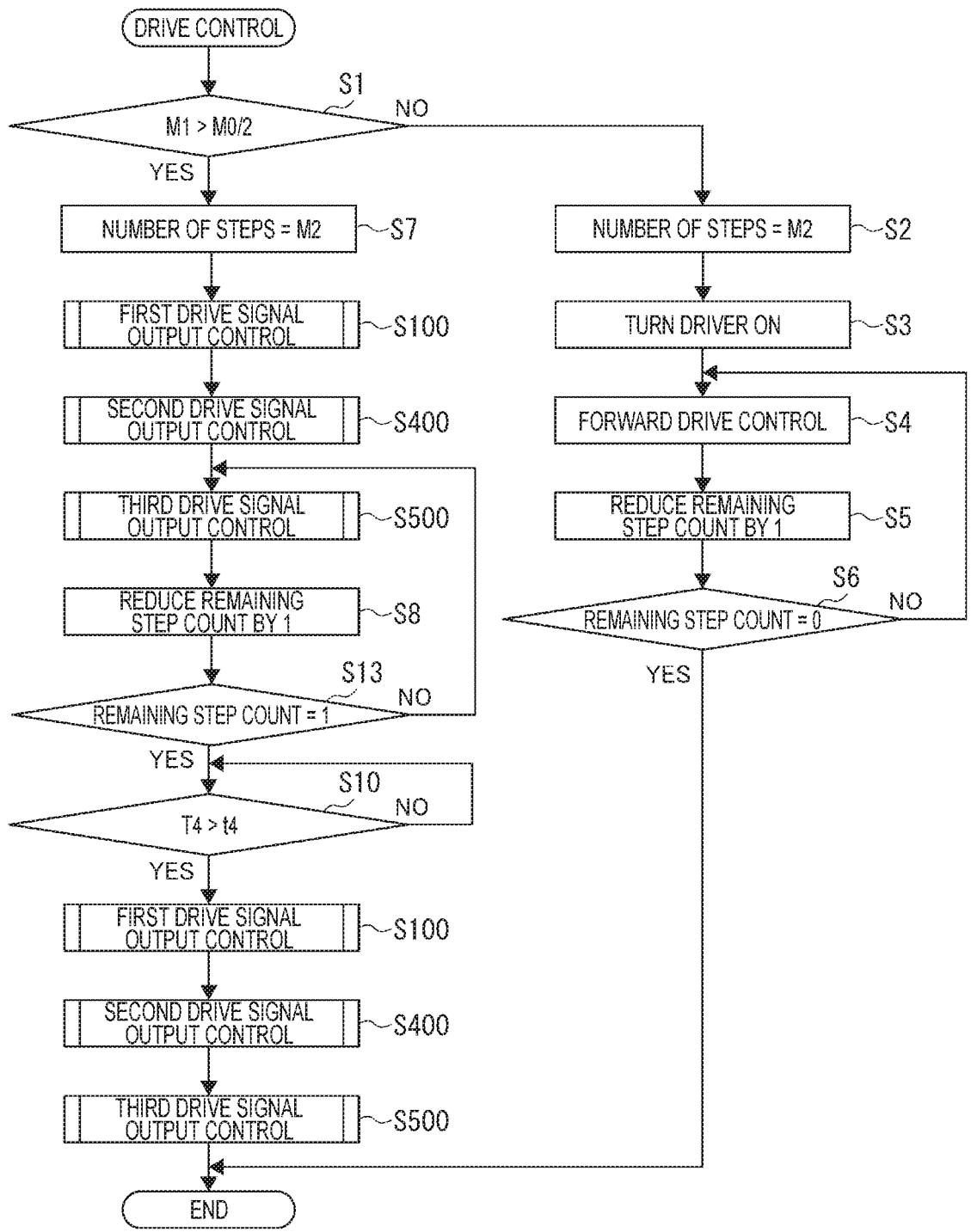
FIG. 15 is a flow chart describing the motor control process in a second embodiment.

FIG. 15 is a flow chart describing the motor control process in a second embodiment of the disclosure. Steps S1 to S8, and S10 in FIG. 15 are the same as in the first embodiment described above, and further description thereof is omitted.

As shown in FIG. 15, if step S1 returns Yes, the CPU 23, in step S7, outputs to the driver controller 40 a signal setting the number of steps required to move the rotor 133 in the reverse direction as M2. The CPU 23 then outputs a signal causing the driver controller 40 to execute the first to third drive signals control processes as steps S100, S400, S500.

Reverse Drive Control

Figure 16:
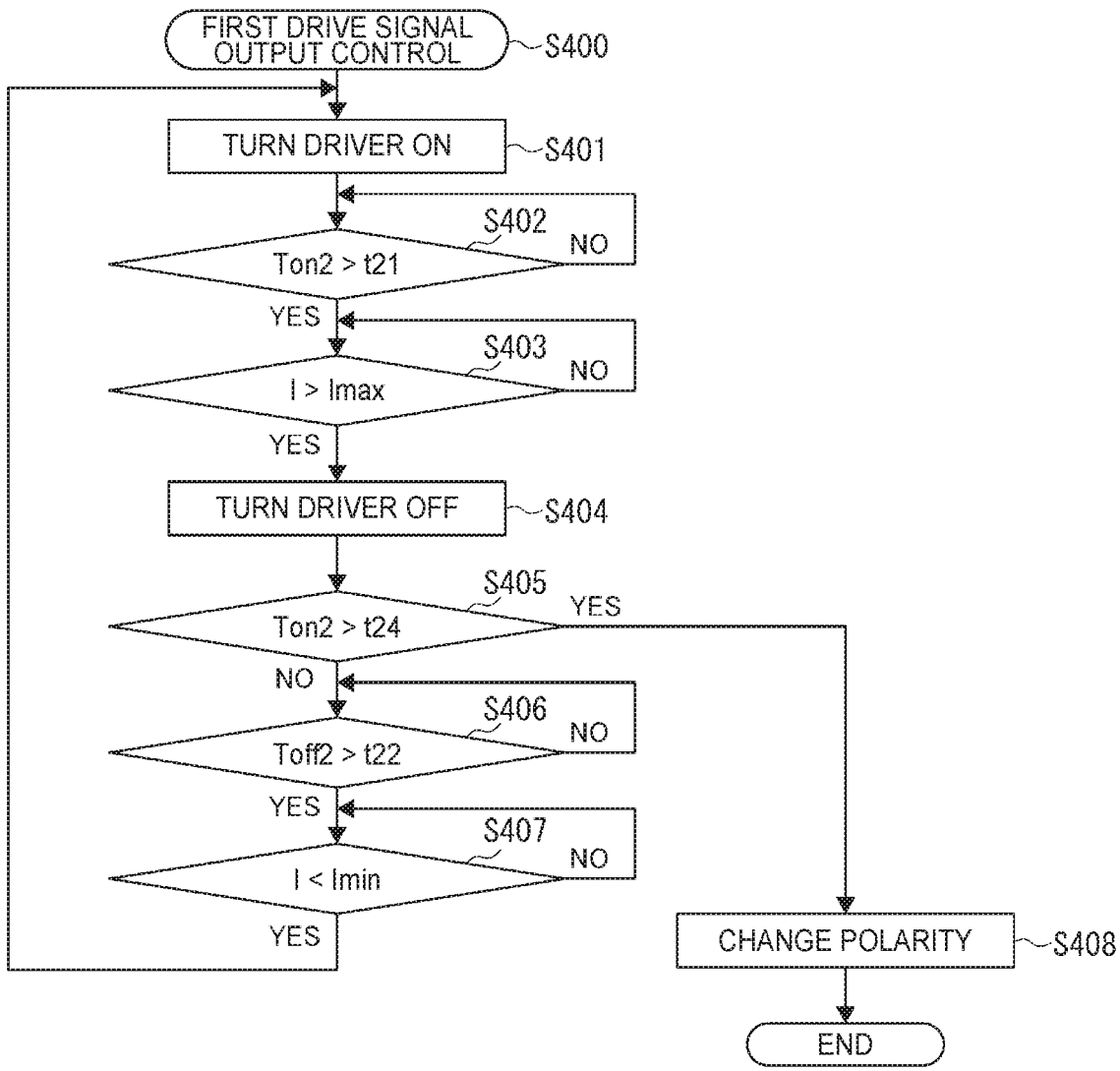
FIG. 16 is a flow chart describing a process of outputting a second drive signal in the second embodiment.
Figure 17:
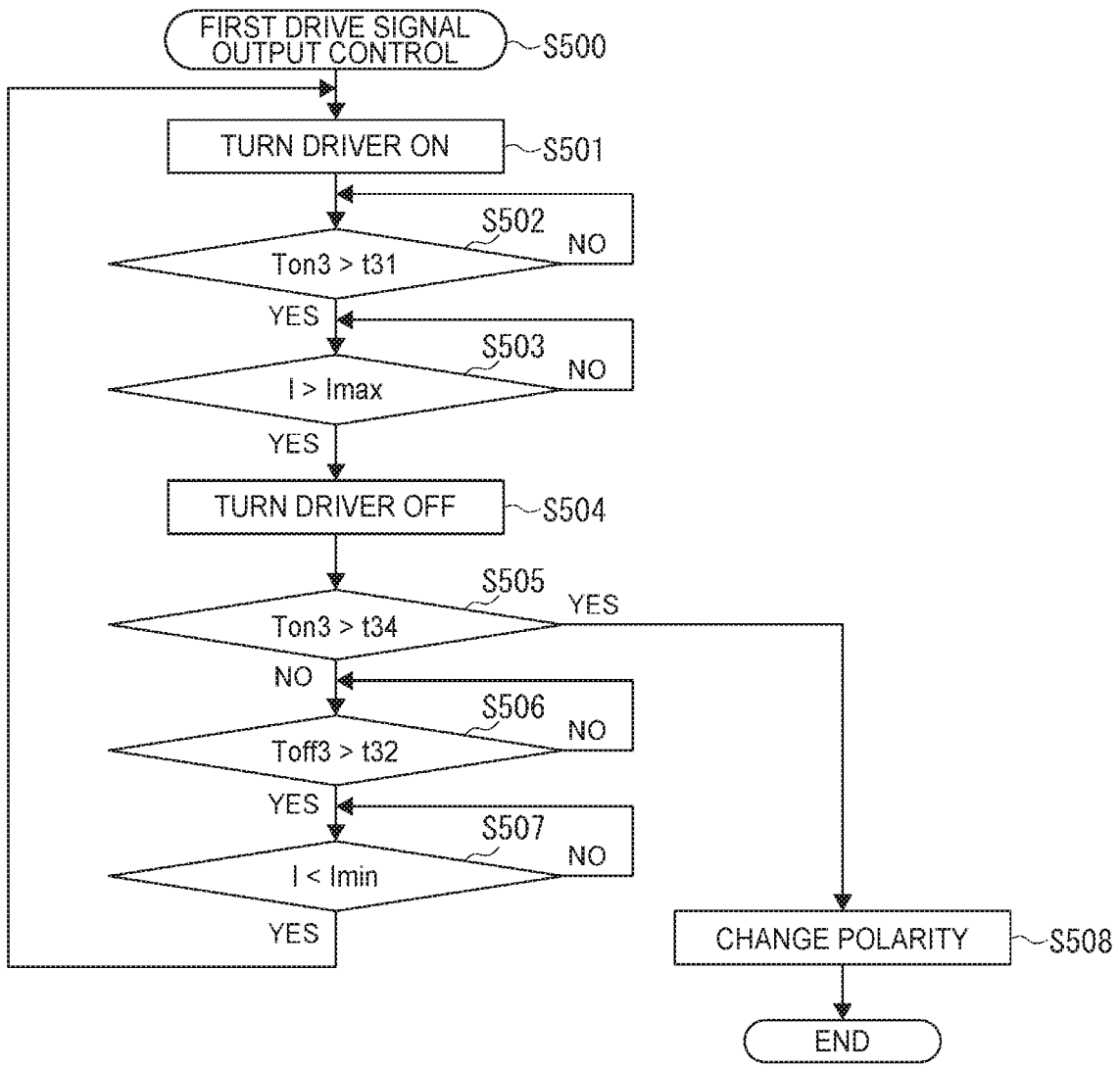
FIG. 17 is a flow chart describing a process of outputting a third drive signal in the second embodiment.

FIG. 16 is a flow chart describing second drive signal output control process S400, and FIG. 17 is a flow chart describing the third drive signal output control process S500, in the reverse drive control process according to this embodiment.

The first drive signal output control process S100 in this embodiment is the same as in the first embodiment, and further description thereof is omitted. In addition, steps S401 to S404, and steps S406 to S408 in FIG. 16 are the same as steps S101 to S104, and steps S106 to S108 in the first embodiment, and further description thereof is omitted. In addition, steps S501 to S504, and steps S506 to S508 in FIG. 17 are the same as steps S101 to S104, and steps S106 to S108 in the first embodiment, and further description thereof is omitted.

As shown in FIG. 16, after the driver controller 40 turns the driver 50 off in step S404 in this embodiment, the driver controller 40 determines in step S405 whether or not the second on time Ton2 exceeds a specific time t24. More specifically, the driver controller 40 is configured to switch from the second drive signal to the third drive signal, without waiting for the current I to go below the minimum current Imin, once the second on time Ton2, which is the continuous time of the on state of the driver 50, exceeds the specific time t24 set as a specific condition.

As shown in FIG. 17, after turning the driver 50 off in step S504, the driver controller 40 determines, in step S505, whether or not the third on time Ton3 exceeds a specific time t34. More specifically, the driver controller 40 is configured to stop outputting the third drive signal, without waiting for the current I to go below the minimum current Imin, once the third on time Ton3, which is the continuous time of the on state of the driver 50, exceeds the specific time t34 set as a specific condition.

Returning to FIG. 15, the driver controller 40 determines in step S13 whether or not the remaining step count equals 1.

If step S13 returns No, control returns to step S500, and the third drive signal output control process repeats. More specifically, the driver controller 40 outputs the third drive signal the number of steps one less than the specific number of steps M2 corresponding to the target rotation of the rotor 133.

If step S13 returns Yes, the driver controller 40, as in the first embodiment, determines in step S10 whether or not the elapsed time T4 since output of the last third drive signal stopped exceeds specific time t4.

If step S10 returns No, the driver controller 40 repeats step S10 until step S10 returns Yes.

If step S10 returns Yes, the driver controller 40 executes the first drive signal output control process as step S100.

The driver controller 40 then executes the second drive signal output control process as step S400.

Next, the driver controller 40 executes the third drive signal output control process as step S500.

Figure 18:
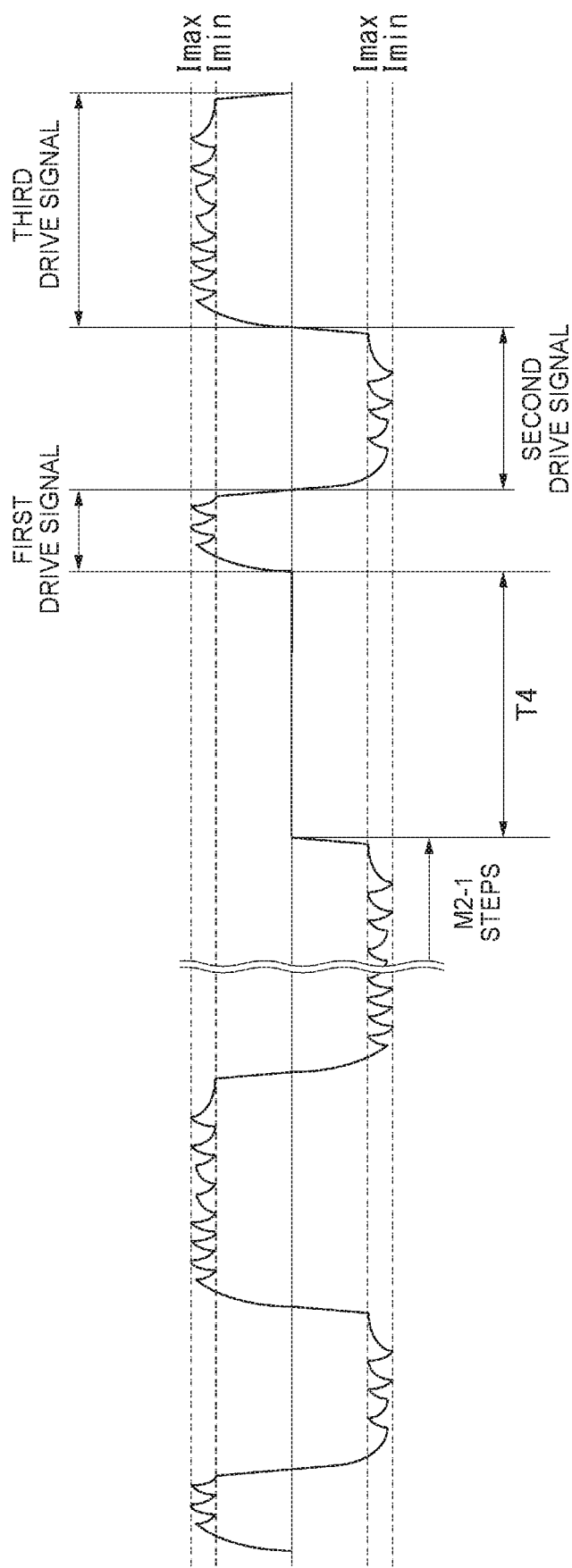
FIG. 18 shows the signal waveforms of the first to third drive signals.

FIG. 18 shows the waveforms of the first to third drive signals in this embodiment of the disclosure.

As shown in FIG. 18, the driver controller 40 outputs the first to third drive signals one step each when specific time t4 has past after output of the third drive signal for (M2−1) steps ends.

Once the third drive signal is output in this iteration of step S500, drive control of the second hand 3 ends.

Effect of Embodiment 2

Effects of the second embodiment are described below.

In this embodiment of the disclosure the driver controller 40 changes the drive signal output to the driver 50 from the first drive signal to the second drive signal when the first on time Ton1, which is the continuous time of the on state corresponding to the first drive signal, exceeds a specific time t13.

The driver controller 40 then switches from the second drive signal to the third drive signal once the second on time Ton2, which is the continuous time of the on state corresponding to the second drive signal, exceeds specific time t24.

The driver controller 40 then stops outputting the third drive signal once the third on time Ton3, which is the continuous time of the on state corresponding to the third drive signal, exceeds specific time t34.

The driver controller 40 in this embodiment therefore estimates the position of the rotor 133, and changes the drive signal, based on a first on time Ton1, a second on time Ton2, and a third on time Ton3. As a result, because the driver controller 40 changes the polarity without waiting for the current I to go below the minimum current Imin after the driver 50 turns off, the time that each drive signal is output can be shortened compared with a configuration in which the drive signal is changed based on the off time, which is the continuous time of the off state of each drive signal. Current consumption can therefore be suppressed.

In this embodiment the driver controller 40 outputs the first drive signal, then outputs the second drive signal, and then outputs one step of the third drive signal once a specific time t4 has past after outputting the third drive signal one step less than the specific number of steps M2.

As a result, the rotor 133 overrunning, that is, reversing one step too much, can be suppressed.

Variations

The disclosure is not limited to the embodiments described above, and can be modified and improved in many ways without departing from the scope of the accompanying claims.

In the embodiments described above, the driver controller 40 changes the drive signal output to the driver 50 from the first drive signal to the second drive signal based on the first on time Ton1, but the disclosure is not so limited.

For example, the driver controller 40 may be configured to change the drive signal output to the driver 50 from the first drive signal to the second drive signal based on the first off time Toff1.

The driver controller 40 may also be configured to change the drive signal output to the driver 50 from the first drive signal to the second drive signal when a previously set time has past since outputting the first drive signal started.

In the first embodiment described above, the driver controller 40 changes the drive signal output to the driver 50 from the second drive signal to the third drive signal based on the second off time Toff2, but the disclosure is not so limited.

For example, the driver controller 40 may be configured to change the drive signal output to the driver 50 from the first drive signal to the second drive signal based on the second on time Ton2.

The driver controller 40 may also be configured in the first embodiment to change the drive signal output to the driver 50 from the second drive signal to the third drive signal when a previously set time has past since outputting the second drive signal started.

In the second embodiment described above, the driver controller 40 changes the drive signal output to the driver 50 from the second drive signal to the third drive signal based on the second on time Ton2, but the disclosure is not so limited.

For example, the driver controller 40 may be configured to change the drive signal output to the driver 50 from the second drive signal to the third drive signal based on the second off time Toff2.

The driver controller 40 may also be configured in the second embodiment to change the drive signal output to the driver 50 from the second drive signal to the third drive signal when a previously set time has past since outputting the second drive signal started.

In the first embodiment, the driver controller 40 stops outputting the third drive signal to the driver 50 based on the third off time Toff3, but the disclosure is not so limited. For example, the driver controller 40 may be configured to stop outputting the third drive signal to the driver 50 based on the third on time Ton3.

In the second embodiment, the driver controller 40 stops outputting the third drive signal to the driver 50 based on the third on time Ton3, but the disclosure is not so limited. For example, the driver controller 40 may be configured to stop outputting the third drive signal to the driver 50 based on the third off time Toff3.

In the first embodiment, the driver controller 40 stops outputting the correction drive signal after outputting the last third drive signal, but the disclosure is not so limited. For example, the driver controller 40 not outputting the correction drive signal is also included in the scope of the disclosure.

As described in the second embodiment, the driver controller 40 may also be configured in the first embodiment to output the third drive signal one step less than the specific number of steps M2 corresponding to the target rotation of the rotor 133, and then output the first to third drive signals.

In the second embodiment the driver controller 40 may also be configured to output the third drive signal one step less than the specific number of steps M2 corresponding to the target rotation of the rotor 133, then output the first to third drive signals, and then output the correction drive signal.

The driver controller 40 may also be configured to output the third drive signal a specific number of steps M2 corresponding to the target rotation of the rotor 133, and may further be configured to output the correction drive signal after outputting the last third drive signal.

In the embodiments described above specific times t11, t21, t31 are set as the minimum time the driver 50 is on, but the disclosure is not so limited, and configurations in which these specific times are not set are also included in the scope of the disclosure.

Likewise, in the embodiments described above specific times t12, t22, t32 are set as the minimum time the driver 50 is off, but the disclosure is not so limited, and configurations in which these specific times are not set are also included in the scope of the disclosure.

The electronic timepiece 1 described in the foregoing embodiments is a wristwatch, but may be a table clock, for example.

The motor control circuit of the disclosure is also not limited to controlling motors that drive the hands of a timepiece, and can be applied to motor control circuits for a date indicator, for example.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. An electronic timepiece comprising:
    a stepper motor including a coil, and a rotor that is pulled to a first statically stable position or a second statically stable position when a magnetic field that drives the rotor is not produced in the coil, and is pulled to a dynamically stable position when the magnetic field is produced in the coil;

a current detector configured to detect a current value flowing through the coil;

a driver controller configured to output, according to the current value the current detector detected, a first drive signal causing the rotor to turn in a forward direction from the first statically stable position to a position circumferentially offset from the second statically stable position, output, according to the current value the current detector detected, a second drive signal causing the rotor to turn in a reverse direction, which is opposite the forward direction, past the dynamically stable position after outputting the first drive signal, and output, according to the current value the current detector detected, a third drive signal causing the rotor to turn in the reverse direction after outputting the second drive signal; and a driver that is controlled, according to the first drive signal, the second drive signal, and the third drive signal, to an on state supplying drive current to the coil and an off state not supplying drive current to the coil, wherein the driver controller outputs the third drive signal a specific number of steps corresponding to a target rotation of the rotor.

2. The electronic timepiece described in claim 1, wherein:
the driver controller outputs the first drive signal controlling the driver to the on state and the off state, and
when a first on time, which is a continuous time of the on state corresponding to the first drive signal, or a first off time, which is a continuous time of the off state corresponding to the first drive signal, meets a specific condition, changes the drive signal output to the driver from the first drive signal to the second drive signal.

3. The electronic timepiece described in claim 1, wherein:
the driver controller changes the drive signal output to the driver from the first drive signal to the second drive signal when a previously set time has passed after starting output of the first drive signal.

4. The electronic timepiece described in claim 1, wherein:
the driver controller outputs the second drive signal controlling the driver to the on state and the off state, and
when a second on time, which is a continuous time of the on state corresponding to the second drive signal, or a second off time, which is a continuous time of the off state corresponding to the second drive signal, meets a specific condition, changes the drive signal output to the driver from the second drive signal to the third drive signal.

5. The electronic timepiece described in claim 1, wherein:
the driver controller changes the drive signal output to the driver from the second drive signal to the third drive signal when a previously set time has passed after starting output of the second drive signal.

6. The electronic timepiece described in claim 1, wherein:
the driver controller outputs the third drive signal controlling the driver to the on state and the off state, and
when a third on time, which is a continuous time of the on state corresponding to the third drive signal, or a third off time, which is a continuous time of the off state corresponding to the third drive signal, meets a specific condition, stops outputting the third drive signal.

7. The electronic timepiece described in claim 1, wherein:
the driver controller outputs, after the last third drive signal, a correction drive signal that produces a magnetic field in the same direction as the direction of the magnetic field produced by the last third drive signal of the specific number of steps.

8. The electronic timepiece described in claim 1, wherein:
the driver controller outputs the first drive signal, then outputs the second drive signal, and then outputs one step of the third drive signal when a specific time has passed after outputting the third drive signal one step less than the specific number of steps.

9. Moving parts of a timepiece comprising:
a stepper motor including a coil, and a rotor that is pulled to a first statically stable position or a second statically stable position when a magnetic field that drives the rotor is not produced in the coil, and is pulled to a dynamically stable position when the magnetic field is produced in the coil;
a current detector configured to detect a current value flowing through the coil;
a driver controller configured to
output, according to the current value the current detector detected, a first drive signal causing the rotor to turn in a forward direction from the first statically stable position to a position circumferentially offset from the second statically stable position,
output, according to the current value the current detector detected, a second drive signal causing the rotor to turn in a reverse direction, which is opposite the forward direction, past the dynamically stable position after outputting the first drive signal, and
output, according to the current value the current detector detected, a third drive signal causing the rotor to turn in the reverse direction after outputting the second drive signal; and
a driver that is controlled, according to the first drive signal, the second drive signal, and the third drive signal, to an on state supplying drive current to the coil and an off state not supplying drive current to the coil, wherein the driver controller outputs the third drive signal a specific number of steps corresponding to a target rotation of the rotor.

10. A motor control circuit comprising:
a current detector configured to detect a current value flowing through the coil of a stepper motor including a coil, and a rotor that is pulled to a first statically stable position or a second statically stable position when a magnetic field that drives the rotor is not produced in the coil, and is pulled to a dynamically stable position when the magnetic field is produced in the coil;
a driver controller configured to
output, according to the current value the current detector detected, a first drive signal causing the rotor to turn in a forward direction from the first statically stable position to a position circumferentially offset from the second statically stable position,
output, according to the current value the current detector detected, a second drive signal causing the rotor to turn in a reverse direction, which is opposite the forward direction, past the dynamically stable position after outputting the first drive signal, and
output, according to the current value the current detector detected, a third drive signal causing the rotor to turn in the reverse direction after outputting the second drive signal; and
a driver that is controlled, according to the first drive signal, the second drive signal, and the third drive signal, to an on state supplying drive current to the coil and an off state not supplying drive current to the coil, wherein the driver controller outputs the third drive signal a specific number of steps corresponding to a target rotation of the rotor.

\* \* \* \* \*